(12) United States Patent
Wu et al.

(10) Patent No.: US 10,791,522 B2
(45) Date of Patent: Sep. 29, 2020

(54) WIRELESS COMMUNICATION METHOD AND DEVICE

(71) Applicant: Huawei Technologies Co., Ltd., Shenzhen (CN)

(72) Inventors: Hai Wu, Beijing (CN); Zhiheng Guo, Beijing (CN); Xingqing Cheng, Beijing (CN); Yi Long, Beijing (CN); Xinqian Xie, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 176 days.

(21) Appl. No.: 16/021,889

(22) Filed: Jun. 28, 2018

(65) Prior Publication Data

US 2018/0310252 A1 Oct. 25, 2018

Related U.S. Application Data

(63) Continuation of application No. PCT/CN2016/105207, filed on Nov. 9, 2016.

(30) Foreign Application Priority Data

Dec. 31, 2015 (WO) ................ PCT/CN2015/100172

(51) Int. Cl.
*H04W 52/14* (2009.01)
*H04L 1/00* (2006.01)
(Continued)

(52) U.S. Cl.
CPC ........ *H04W 52/143* (2013.01); *H04B 7/0473* (2013.01); *H04B 7/0639* (2013.01);
(Continued)

(58) Field of Classification Search
None
See application file for complete search history.

(56) References Cited

U.S. PATENT DOCUMENTS

2007/0249383 A1* 10/2007 Wiklof ................ G06K 7/0004
455/522
2015/0312074 A1 10/2015 Zhu et al.
(Continued)

FOREIGN PATENT DOCUMENTS

CN 104104467 A 10/2014
CN 104158631 A 11/2014
(Continued)

OTHER PUBLICATIONS

RP-150496 MediaTek Inc.,"New SI Proposal: Study on Downlink Multiuser Superposition Transmission for LTE",3GPP TSG RAN Meeting #67,Shanghai, China, Mar. 9-12, 2015,6 pages.
(Continued)

*Primary Examiner* — Fayyaz Alam
(74) *Attorney, Agent, or Firm* — Leydig, Voit & Mayer, Ltd.

(57) ABSTRACT

Embodiments of the present invention provide a wireless communication method and a device. The wireless communication method includes: determining, by a base station, a transmission mode used to send data to a terminal in a current scheduling period, where the transmission mode is one of a paired transmission mode or a non-paired transmission mode; and sending, by the base station to the terminal, information indicating a terminal type corresponding to the transmission mode. According to the method and device, the terminal may perform corresponding processing according to the transmission mode, thereby improving processing efficiency. For example, the terminal may select an adaptive receiving algorithm to demodulate a signal, to improve demodulation efficiency and accuracy.

17 Claims, 4 Drawing Sheets

(51) Int. Cl.
 H04W 72/04 (2009.01)
 H04W 52/34 (2009.01)
 H04B 7/0456 (2017.01)
 H04B 7/06 (2006.01)
(52) U.S. Cl.
 CPC ............ *H04L 1/00* (2013.01); *H04W 52/346* (2013.01); *H04W 72/04* (2013.01); *H04W 72/0406* (2013.01); *H04W 72/0473* (2013.01)

(56) References Cited

U.S. PATENT DOCUMENTS

2016/0183199 A1 6/2016 Takeda et al.
2016/0330695 A1 11/2016 Benjebbour et al.

FOREIGN PATENT DOCUMENTS

| CN | 104869094 A | 8/2015 |
| CN | 104883746 A | 9/2015 |
| EP | 3386243 A1 | 10/2018 |
| JP | 2015039132 A | 2/2015 |
| JP | 2019024147 A | 2/2019 |
| WO | 2010026287 A1 | 3/2010 |
| WO | 2014161134 A1 | 10/2014 |
| WO | 2015107818 A1 | 7/2015 |

OTHER PUBLICATIONS

3GPP TS 36.211 V12.7.0 (Sep. 2015),3rd Generation Partnership Project;Technical Specification Group Radio Access Network;Evolved Universal Terrestrial Radio Access (E-UTRA);Physical channels and modulation(Release 12),total 136 pages.
3GPP TS 36.212 V12.6.0 (Sep. 2015),3rd Generation Partnership Project;Technical Specification Group Radio Access Network;Evolved Universal Terrestrial Radio Access (E-UTRA);Multiplexing and channel coding(Release 12),total 95 pages.
3GPP TS 36.213 V12.7.0 (Sep. 2015),3rd Generation Partnership Project;Technical Specification Group Radio Access Network;Evolved Universal Terrestrial Radio Access (E-UTRA);Physical layer procedures(Release 12),total 241 pages.
3GPP TS 36.331 V12.7.0 (Sep. 2015),3rd Generation Partnership Project;Technical Specification Group Radio Access Network;Evolved Universal Terrestrial Radio Access (E-UTRA);Radio Resource Control (RRC);Protocol specification (Release 12),total 453 pages.
"Potential Assistance Information for Multiuser Superposition Transmission," 3GPP TSG RAN WG1 Meeting #82bis, Malmö, Sweden, R1-155774, pp. 1-3, 3rd Generation Partnership Project, Valbonne, France (Oct. 5-9, 2015).
"MuST Performance Results Summary", 3GPP TSG-RAN WG1#82, Malmö, Sweden, R1-156084, 3rd Generation Partnership Project, Valbonne, France (Oct. 5-9, 2015).

* cited by examiner

WIRELESS COMMUNICATION METHOD AND DEVICE

CROSS-REFERENCE TO RELATED APPLICATIONS

This application is a continuation of International Application No. PCT/CN2016/105207, filed on Nov. 9, 2016, which claims priority to International Application No. PCT/CN2015/100172, filed on Dec. 31, 2015. The disclosures of the aforementioned applications are hereby incorporated by reference in their entireties.

TECHNICAL FIELD

Embodiments of the present invention relate to the field of wireless communications technologies, and specifically, to a wireless communication method and a device.

BACKGROUND

In a Long Term Evolution (LTE)/Long Term Evolution Advanced (LTE-A) communications system, a downlink multiple access manner usually uses an orthogonal frequency division multiple access (OFDMA) manner. The orthogonal frequency division multiple access manner is mainly characterized in that different users use different time-frequency resources, to ensure that received signals of the different users do not interfere with each other, thereby implementing simple receiving on a user side. However, when communication is performed in the orthogonal frequency division multiple access manner, a time-frequency resource has relatively low utilization, and consequently, an overall transmission rate of the communications system is limited.

Currently, in the LTE/LTE-A system, there are also some potential candidate technologies different from OFDMA, for example, non-orthogonal multiple access (NOMA) and semi-orthogonal multiple access (SOMA). In NOMA and SOMA, users are allocated different power, so that at least two terminals can use a same time-frequency resource. In NOMA, information about a plurality of users can be transmitted on a single resource element (RE). Compared with OFDMA, in NOMA, the overall transmission rate of the system is increased. In addition, in a SOMA transmission manner, a Gray code feature of an existing modulation (or constellation diagram) scheme is used, so that a user receiver can use a simple receiving algorithm, thereby further improving system performance. FIG. 1 is a schematic diagram of comparison between OFDMA, SOMA, and NOMA.

However, currently, NOMA and SOMA are not fully studied, and efficiency and accuracy of terminal processing in a similar system are relatively low.

SUMMARY

Embodiments of the present invention provide a wireless communication method and a device, so as to improve efficiency and accuracy of terminal processing.

According to a first aspect, an embodiment of the present invention provides a wireless communication method, including: determining, by a base station, a transmission mode used to send data to a terminal in a current scheduling period, where the transmission mode is one of a paired transmission mode or a non-paired transmission mode; and sending, by the base station to the terminal, information indicating a terminal type corresponding to the transmission mode.

According to the communication method, the information indicating the terminal type corresponding to the transmission mode is transferred, so that the terminal can learn of transmission mode information, and the terminal can perform corresponding processing according to the transmission mode, thereby improving processing efficiency. For example, the terminal may select an adaptive receiving algorithm to demodulate a signal, to improve demodulation efficiency and accuracy.

Optionally, the information indicating the terminal type corresponding to the transmission mode may be dynamically sent to the terminal by using downlink control information. For example, the downlink control information may be sent to the terminal by using a physical downlink control channel (Physical Downlink Control Channel, PDCCH).

For example, the indication information may be a field of at least 1 bit. When the information indicating the terminal type corresponding to the transmission mode is information of 1 bit, the terminal type corresponding to the transmission mode includes: the terminal type corresponding to the transmission mode is one of a near terminal in the paired transmission mode or a non-near terminal, where the non-near terminal includes a terminal in the non-paired transmission mode and a far terminal in the paired transmission mode. When the information indicating the terminal type corresponding to the transmission mode is information of more than 1 bit, the terminal type corresponding to the transmission mode includes at least one of a terminal in the non-paired transmission mode, a near terminal in the paired transmission mode, or a far terminal in the paired transmission mode. By means of the manner, the terminal can learn of the transmission mode information in time, and 1 bit is used to carry the information indicating the terminal type corresponding to the transmission mode, so that more signaling overheads may be reduced.

The base station may further notify the terminal of a power parameter used to determine downlink data transmit power, where the power parameter includes $PA_{MUST}$, and $PA_{MUST}$ is a power parameter in a MUST system, and is the same as or different from $P_A$.

Further, optionally, $PA_{MUST}$ may be a cell-level parameter, so as to reduce complexity. Further, $PA_{MUST}$ may be delivered to the terminal by using higher layer signaling, for example, may be delivered by using radio resource control RRC signaling.

Further, to enable the terminal to determine the downlink data transmit power, the base station may further send downlink data transmit power ratio/coefficient information or indication information of downlink data transmit power ratio/coefficient information to the terminal, where the downlink data transmit power ratio/coefficient information is a downlink data transmit power ratio/coefficient of the terminal in the paired transmission mode or a downlink data transmit power ratio/coefficient set of the terminal in the paired transmission mode. The downlink data transmit power ratio/coefficient may be 0.2:0.8, 10:32, 42:128, 1:16, 1:20, or the like, and the downlink data transmit power ratio/coefficient set may be a set including at least one of the elements or another set.

For example, the downlink data transmit power ratio/coefficient information may be determined according to a signal to interference plus noise ratio of the terminal and/or a modulation scheme of a signal sent by the base station to the terminal, so as to ensure fairness.

Optionally, the base station may determine the downlink data transmit power ratio/coefficient information in a flexible power allocation mode or a fixed power allocation mode.

Optionally, the downlink data transmit power ratio/coefficient information or the indication information of the downlink data transmit power ratio/coefficient information is sent to the terminal by using higher layer signaling or downlink control information. In addition, the downlink data transmit power ratio/coefficient set may include a special value, and the special value may indicate that the terminal type is a terminal in the non-paired transmission mode.

Optionally, the base station may further receive feedback information that indicates whether demodulation succeeds and that is sent by the terminal, to determine whether to perform retransmission, thereby improving transmission reliability.

According to a second aspect, an embodiment of the present invention further provides a wireless communication method, applied to a multiuser superposition transmission MUST system, including:

receiving, by a terminal, information that indicates a terminal type corresponding to a transmission mode and that is sent by a base station, where the transmission mode is a transmission mode that is determined by the base station and that is used to send data to the terminal in a current scheduling period, and is one of a paired transmission mode or a non-paired transmission mode; and determining, by the terminal according to the information, a transmission mode used by the terminal.

For example, the information indicating the terminal type corresponding to the transmission mode is information of 1 bit or information of more than 1 bit. When the information indicating the terminal type corresponding to the transmission mode is information of 1 bit, the terminal type corresponding to the transmission mode includes: the terminal type corresponding to the transmission mode is one of a near terminal in the paired transmission mode or a non-near terminal, where the non-near terminal includes a terminal in the non-paired transmission mode and a far terminal in the paired transmission mode. When the information indicating the terminal type corresponding to the transmission mode is information of more than 1 bit, the terminal type corresponding to the transmission mode includes at least one of a terminal in the non-paired transmission mode, a near terminal in the paired transmission mode, or a far terminal in the paired transmission mode.

Optionally, the terminal may further receive a power parameter that is notified by the base station and that is used to determine downlink data transmit power, where the power parameter includes $PA_{MUST}$, and $PA_{MUST}$ is a power parameter in the MUST system, and is the same as or different from $P_A$.

Optionally, $PA_{MUST}$ may be a cell-level parameter, so as to reduce complexity. Further, $PA_{MUST}$ may be delivered to the terminal by using higher layer signaling.

Optionally, the terminal may determine, according to energy per resource element of a cell-specific reference signal, the power parameter used to determine the downlink data transmit power, and the information indicating the transmission mode used by the base station to send data to the terminal in the current scheduling period, downlink data transmit power that is used by the base station to send data to the terminal. Optionally, the terminal may demodulate received downlink data according to the determined downlink data transmit power, and feed back, to the base station, information indicating whether demodulation succeeds.

Optionally, the terminal may use downlink data transmit power ratio/coefficient information when determining the downlink data transmit power. The downlink data transmit power ratio/coefficient information may be sent by the base station, or may be stored in the terminal.

Optionally, if the terminal uses the paired transmission mode, the terminal determines, according to the downlink data transmit power ratio/coefficient information, a downlink data transmit power share occupied by the terminal in downlink data transmit power of a pair of terminals in the paired transmission mode. The terminal determines the downlink data transmit power according to the downlink data transmit power share, the energy per resource element of the cell-specific reference signal, the power parameter used to determine the downlink data transmit power, and the information indicating the transmission mode used by the base station to send data to the terminal in the current scheduling period.

According to the communication method, the information indicating the terminal type corresponding to the transmission mode is transferred, so that the terminal can learn of transmission mode information, and the terminal can perform corresponding processing according to the transmission mode, thereby improving processing efficiency. For example, the terminal may select an adaptive receiving algorithm to demodulate a signal, to improve demodulation efficiency and accuracy.

According to a third aspect, an embodiment of the present invention further provides a base station that supports a multiuser superposition transmission MUST system, and the base station has a function of implementing a behavior of a base station in the foregoing method design. The function may be implemented by using hardware, or may be implemented by hardware executing corresponding software. The hardware or the software includes one or more modules corresponding to the function.

In a possible design, a structure of the base station includes a processor and a transmitter. The processor is configured to support the base station in performing a corresponding function in the foregoing method. The transmitter is configured to support communication between the base station and a terminal, and send information or an instruction in the foregoing method to the terminal.

In a possible design, the structure of the base station may further include a receiver, configured to receive information or an instruction that is in the foregoing method and that is sent by the terminal.

According to a fourth aspect, an embodiment of the present invention further provides a terminal that supports a MUST system, and the terminal has a function of implementing a behavior of a terminal in the foregoing method design. The function may be implemented by using hardware, or may be implemented by hardware executing corresponding software. The hardware or the software includes one or more modules corresponding to the function. The module may be software and/or hardware.

In a possible design, a structure of the terminal includes a receiver and a processor. The processor is configured to support the terminal in performing a corresponding function in the foregoing method. The receiver is configured to support communication between a base station and the terminal, and receive information or an instruction that is in the foregoing method and that is sent by the base station.

In a possible design, the structure of the terminal may further include a transmitter, configured to send information or an instruction in the foregoing method to the base station.

An embodiment of the present invention provides a computer storage medium, configured to store a computer software instruction used by the foregoing base station, and the computer software instruction includes a program designed to perform the foregoing aspects.

According to another aspect, an embodiment of the present invention provides a computer storage medium, configured to store a computer software instruction used by the foregoing terminal, and the computer software instruction includes a program designed to perform the foregoing aspects.

According to the solutions provided in the embodiments of the present invention, efficiency and accuracy of terminal processing may be improved.

DESCRIPTION OF EMBODIMENTS

The following describes the technical solutions in the embodiments of the present invention with reference to the accompanying drawings in the embodiments of the present invention. The described embodiments are some rather than all of the embodiments of the present invention. All other embodiments obtained by a person of ordinary skill in the art based on the embodiments of the present invention without creative efforts shall fall within the protection scope of the present invention.

It should be understood that, the technical solutions in the embodiments of the present invention may be applied to a plurality of communications systems, for example, a Long Term Evolution (LTE) system, an LTE frequency division duplex (FDD) system, and LTE time division duplex (TDD).

It should also be understood that in the embodiments of the present invention, a terminal may be referred to as user equipment (UE), a mobile station (MS), a mobile terminal, or the like. The terminal may access a radio access network (RAN) to perform communication. Specifically, the terminal may be a mobile phone (or referred to as a "cellular" phone), a computer with a mobile terminal, or the like, or may be a portable, pocket-sized, handheld, computer built-in, or in-vehicle mobile apparatus, which exchanges voice and/or data with the radio access network. For ease of description, all the devices are collectively referred to as a terminal in this specification.

In the embodiments of the present invention, a base station may be an evolved NodeB (ENB or e-NodeB) in LTE, or may be a base station in another evolved network, and this is not limited in the embodiments of the present invention. However, for ease of description, all the devices are collectively referred to as a base station.

It should be noted that, for ease of description, in the following embodiments of the present invention, transmission modes similar to NOMA and SOMA may be collectively referred to as a multiuser superposition transmission (MUST) mode, and a system including the MUST mode is referred to as a MUST system. In the MUST system, a terminal may operate in a paired transmission mode and a non-paired transmission mode.

Figure 1:
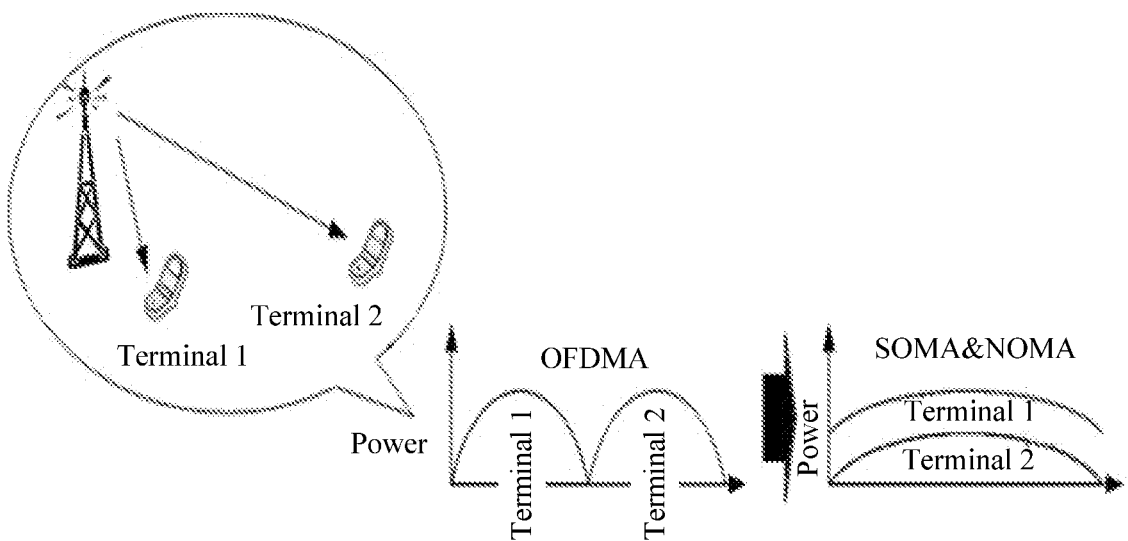
FIG. 1 is a schematic diagram of comparison between OFDMA, SOMA, and NOMA.
Figure 2:
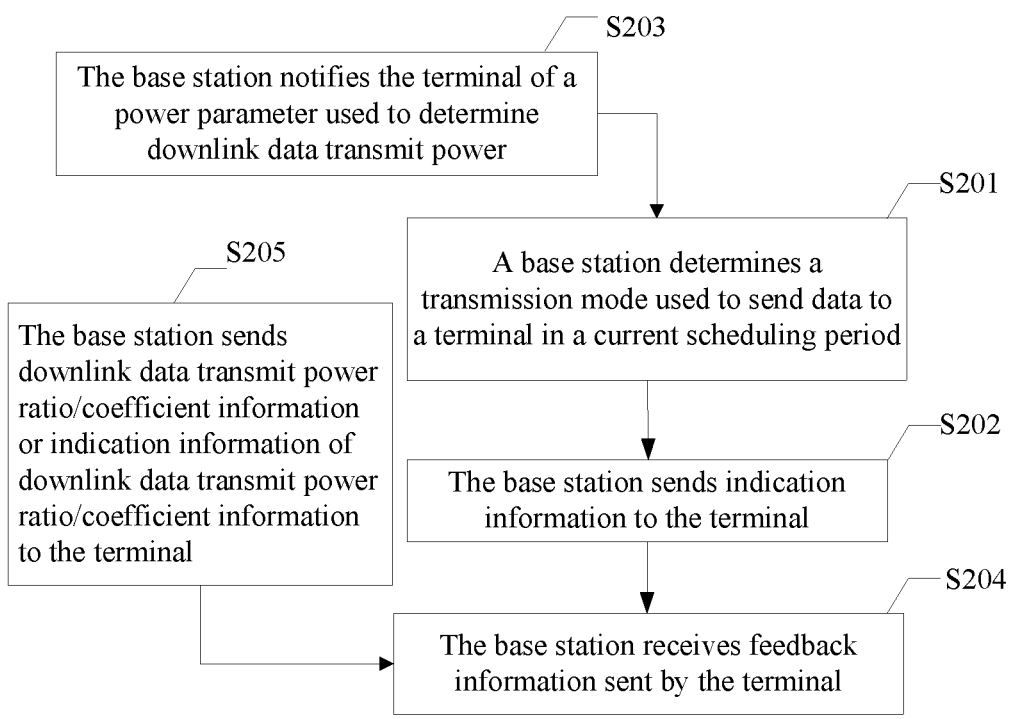
FIG. 2 is a flowchart of a wireless communication method according to an embodiment of the present invention.

Referring to FIG. 2, a wireless communication method provided in an embodiment of the present invention may be applied to a MUST system. The method may be implemented by using a base station, and may include the following steps.

S201. The base station determines a transmission mode used to send data to a terminal in a current scheduling period, where the transmission mode is one of a paired transmission mode or a non-paired transmission mode.

S202. The base station sends, to the terminal, information indicating a terminal type corresponding to the transmission mode.

A scheduling period may be understood as a basic unit of a time controlled by radio resource management, for example, may be a transmission time interval (TTI). The base station may send data to the terminal in different transmission modes according to an actual case, for example, in the non-paired transmission mode or the paired transmission mode. The paired transmission mode means that two terminals use a same time-frequency resource to perform transmission. The non-paired transmission mode is an existing conventional transmission mode, and means that different time-frequency resources are allocated to all terminals to perform transmission. Specifically, in each scheduling period, the base station may schedule at least one terminal, and determine, for each scheduled terminal, a transmission mode used to send data to the scheduled terminal. For convenience, in the following specification, the transmission mode used by the base station to send data to the terminal is briefly referred to as a transmission mode of the terminal or a transmission mode used by the terminal.

Further, the base station may determine a transmission mode of each currently scheduled terminal according to different requirements or factors. A specific manner of determining a transmission mode of each terminal is not limited in this embodiment of the present invention. For example, the base station may determine, in each scheduling period, a transmission mode of a scheduled terminal according to a signal to interference plus noise ratio and a scheduling priority that are of the terminal. Specifically, the paired transmission mode may be used for two terminals that have same or close scheduling priorities but an absolute value of a difference between signal to interference plus noise ratios of the two terminals is greater than or equal to a preset value, and the non-paired transmission mode is used for two terminals that have same or close scheduling priorities and an absolute value of a difference between signal to interference plus noise ratios of the two terminals is less than the preset value. It should be noted that, that scheduling priorities are close may mean that a difference between the scheduling priorities of the two terminals is relatively small. For example, an absolute value of a difference between scheduling priority indications is 1. This is not limited in this embodiment of the present invention. It may be understood that, the base station may alternatively determine, according to only a signal to interference plus noise ratio of a terminal, a specific transmission mode used by the terminal. For example, any terminal having a signal to interference plus noise ratio higher than a preset high threshold is paired with any terminal having a signal to interference plus noise ratio lower than a preset low threshold. In this way, the paired terminals may be referred to as terminals that determine to use the paired transmission mode, and other unpaired terminals use the non-paired transmission mode. In addition, for a manner in which the base station determines a scheduling priority and a signal to interference plus noise ratio that are of a terminal, refer to the prior art, and this is not limited in this embodiment of the present invention. It may be understood that, a pair of terminals using the paired transmission mode are paired terminals to each other.

A pair of terminals using the paired transmission mode may be separately referred to as a near terminal and a far terminal. The pair of terminals may be distinguished according to a specific reference factor or criterion. For example, a near terminal and a far terminal may be distinguished according to signal to interference plus noise ratios of terminals. For example, in a pair of terminals participating in paired transmission, a terminal having a higher signal to interference plus noise ratio may be referred to as a near terminal, and a terminal having a lower signal to interference plus noise ratio may be referred to as a far terminal. Alternatively, a near terminal and a far terminal may be distinguished according to behaviors of terminals. For example, in a pair of terminals participating in paired transmission, a terminal using an advanced receiver to demodulate data may be referred to as a near terminal, and a terminal using a conventional receiver to demodulate data may be referred to as a far terminal. Alternatively, a near terminal and a far terminal may be distinguished according to interference statuses of terminals. For example, the near terminal is a terminal assumed to suffer interference from a paired terminal when the terminal performs receiving, and the far terminal is a terminal assumed to suffer no interference from a paired terminal when the terminal performs receiving. A specific manner of distinguishing the near terminal and the far terminal is not limited in this embodiment of the present invention.

As described above, in S201, the transmission mode determined by the base station for each scheduled terminal may be one of the non-paired transmission mode or the paired transmission mode. However, terminals in the paired transmission mode are classified into a near terminal and a far terminal. To enable the terminal to learn of the transmission mode determined by the base station, after the base station determines the transmission mode of the terminal, the base station sends, to each terminal, information indicating a terminal type corresponding to the transmission mode. The indication information may indicate whether the terminal uses the paired transmission mode, and when the terminal uses the paired transmission mode, the indication information may further indicate whether the terminal is a near terminal or a far terminal in the paired transmission mode.

Specifically, when sending, to the terminal, the information indicating the terminal type corresponding to the transmission mode, the base station may add, to a field of at least 1 bit, the information indicating the terminal type corresponding to the transmission mode. There is a specific correspondence between different bit values and information about terminal types corresponding to transmission modes. For example, when the information indicating the terminal type corresponding to the transmission mode is information of 1 bit, the terminal type that corresponds to the transmission mode and that can be indicated includes one of a near terminal in the paired transmission mode or a non-near terminal, and the non-near terminal includes a terminal in the non-paired transmission mode and a far terminal in the paired transmission mode.

Alternatively, when the information indicating the terminal type corresponding to the transmission mode is information of more than 1 bit, the terminal type that corresponds to the transmission mode and that can be indicated includes at least one of a terminal in the non-paired transmission mode, a near terminal in the paired transmission mode, or a far terminal in the paired transmission mode.

For example, a correspondence between a bit value and a terminal type corresponding to a transmission mode may be shown in Table 1.

TABLE 1

| Bit value | Terminal type |
| --- | --- |
| 1 | Near terminal in a paired transmission mode |
| 0 | Terminal in a non-paired transmission mode and a far terminal in a paired transmission mode (that is, a non-near terminal) |

In Table 1, when a bit value received by the terminal is 0, the terminal can learn only that the terminal is one of a terminal in the non-paired transmission mode or a far terminal in the paired transmission mode.

Alternatively, a correspondence between a bit value and a terminal type corresponding to a transmission mode may be shown in Table 2.

TABLE 2

| Bit value | Terminal type |
| --- | --- |
| 00 | Terminal in a non-paired transmission mode |
| 01 | Far terminal in a paired transmission mode |
| 10 | Near terminal in a paired transmission mode |
| 11 | Reserved or else |

Specifically, in Table 2, a 2-bit field is used to indicate transmission mode information of a terminal. For example, "00" represents a terminal in the non-paired transmission mode, "01" represents a far terminal in the paired transmission mode, and "10" represents a near terminal in the paired transmission mode.

It should be noted that, Table 1 and Table 2 are merely examples for describing the correspondence between a bit value and a terminal type corresponding to a transmission mode, and this is not limited in this embodiment of the present invention provided that different bit values can represent different terminal types.

Further, the field used to indicate the information about the terminal type corresponding to the transmission mode may be added to an existing message and sent to the terminal, or may be sent to the terminal by using a dedicated message. The existing message may be downlink control information (DCI), and the DCI may be sent from the base station to the terminal by using a physical downlink control channel (PDCCH).

In addition, the base station may further send at least one of indication information of a demodulation reference signal (DMRS) port of a paired terminal of the terminal or indication information of a modulation scheme of a paired terminal of the terminal to the terminal.

In a possible implementation, the information indicating the terminal type corresponding to the transmission mode, the indication information of the DMRS port of the paired terminal of the terminal, and the indication information of the modulation scheme of the paired terminal of the terminal are added to a first field and sent to the terminal. Specifically, the first field may indicate the information in a joint coding manner.

For example, a quantity of bits of the first field is not limited, for example, the first field may include 7 bits, 6 bits, 5 bits, 4 bits, or 3 bits. Specifically, when the first field has 7 bits, 128 states may be indicated. Further, 125 of the 128 states may be used to jointly indicate the three pieces of information, and the other three states are reserved. Indicated meanings of states corresponding to the first field are shown in Table X1. It may be understood that, a correspondence between a value corresponding to a bit included in the first field and an indicated meaning is not limited to Table X1. Alternatively, states of the first field that jointly indicate the three pieces of information may be a subset of states in Table X1, for example, the states are some of the 125 states shown in Table X1, and the other remaining states are unavailable or reserved fields.

When the first field includes another quantity of bits, indicated meanings of the first field are similar to those in Table X1. For example, when the first field has 6 bits, indicated meanings of states corresponding to the first field are shown in Table X2. When the first field has 5 bits, 64 states may be indicated. Further, 25 of the 64 states may be used to jointly indicate the three pieces of information, the other 39 states are reserved, and indicated meanings of states corresponding to the first field are shown in Table X3. When the first field has 4 bits, indicated meanings of states corresponding to the first field are shown in Table X4. When the first field includes 3 bits, eight states may be indicated in total. Five states indicate the terminal type and the modulation scheme that corresponds to the demodulation pilot DMRS port of the paired terminal, the other three states are reserved, and indicated meanings of states corresponding to the first field are shown in Table X5. It may be understood that, in Tables X1 to X5, when an indicated meaning indicates the indication information of the DMRS port of the paired terminal of the terminal and/or the indication information of the modulation scheme of the paired terminal of the terminal, it actually may be understood as that the indicated meaning implicitly indicates that the information about the terminal type corresponding to the transmission mode is a terminal in the paired transmission mode.

TABLE X1

| Value corresponding to a bit | Indicated meaning |
|---|---|
| 0 | Non-paired transmission |
| 1 | $0^{th}$ DMRS port, quadrature phase shift keying (QPSK) |
|   | $1^{st}$ DMRS port, non-paired |
|   | $2^{nd}$ DMRS port, non-paired |
| 2 | $0^{th}$ DMRS port, 16 quadrature amplitude modulation (QAM) |
|   | $1^{st}$ DMRS port, non-paired |
|   | $2^{nd}$ DMRS port, non-paired |
| 3 | $0^{th}$ DMRS port, 64QAM |
|   | $1^{st}$ DMRS port, non-paired |
|   | $2^{nd}$ DMRS port, non-paired |
| 4 | $0^{th}$ DMRS port, 256QAM |
|   | $1^{st}$ DMRS port, non-paired |
|   | $2^{nd}$ DMRS port, non-paired |
| 5 | $1^{st}$ DMRS port, QPSK |
|   | $0^{th}$ DMRS port, non-paired |
|   | $2^{nd}$ DMRS port, non-paired |

TABLE X1-continued

| Value corresponding to a bit | Indicated meaning |
|---|---|
| 6 | $1^{st}$ DMRS port, 16QAM |
|   | $0^{th}$ DMRS port, non-paired |
|   | $2^{nd}$ DMRS port, non-paired |
| 7 | $1^{st}$ DMRS port, 64QAM |
|   | $0^{th}$ DMRS port, non-paired |
|   | $2^{nd}$ DMRS port, non-paired |
| 8 | $1^{st}$ DMRS port, 256QAM |
|   | $0^{th}$ DMRS port, non-paired |
|   | $2^{nd}$ DMRS port, non-paired |
| 9 | $2^{nd}$ DMRS port, QPSK |
|   | $0^{th}$ DMRS port, non-paired |
|   | $1^{st}$ DMRS port, non-paired |
| 10 | $2^{nd}$ DMRS port, 16QAM |
|   | $0^{th}$ DMRS port, non-paired |
|   | $1^{st}$ DMRS port, non-paired |
| 11 | $2^{nd}$ DMRS port, 64QAM |
|   | $0^{th}$ DMRS port, non-paired |
|   | $1^{st}$ DMRS port, non-paired |
| 12 | $2^{nd}$ DMRS port, 256QAM |
|   | $0^{th}$ DMRS port, non-paired |
|   | $1^{st}$ DMRS port, non-paired |
| 13 | $0^{th}$ DMRS port, QPSK |
|   | $1^{st}$ DMRS port, QPSK |
|   | $2^{nd}$ DMRS port, non-paired |
| 14 | $0^{th}$ DMRS port, 16QAM |
|   | $1^{st}$ DMRS port, QPSK |
|   | $2^{nd}$ DMRS port, non-paired |
| 15 | $0^{th}$ DMRS port, 64QAM |
|   | $1^{st}$ DMRS port, QPSK |
|   | $2^{nd}$ DMRS port, non-paired |
| 16 | $0^{th}$ DMRS port, 256QAM |
|   | $1^{st}$ DMRS port, QPSK |
|   | $2^{nd}$ DMRS port, non-paired |
| 17 | $0^{th}$ DMRS port, QPSK |
|   | $1^{st}$ DMRS port, 16QAM |
|   | $2^{nd}$ DMRS port, non-paired |
| 18 | $0^{th}$ DMRS port, 16QAM |
|   | $1^{st}$ DMRS port, 16QAM |
|   | $2^{nd}$ DMRS port, non-paired |
| 19 | $0^{th}$ DMRS port, 64QAM |
|   | $1^{st}$ DMRS port, 16QAM |
|   | $2^{nd}$ DMRS port, non-paired |
| 20 | $0^{th}$ DMRS port, 256QAM |
|   | $1^{st}$ DMRS port, 16QAM |
|   | $2^{nd}$ DMRS port, non-paired |
| 21 | $0^{th}$ DMRS port, QPSK |
|   | $1^{st}$ DMRS port, 64QAM |
|   | $2^{nd}$ DMRS port, non-paired |
| 22 | $0^{th}$ DMRS port, 16QAM |
|   | $1^{st}$ DMRS port, 64QAM |
|   | $2^{nd}$ DMRS port, non-paired |
| 23 | $0^{th}$ DMRS port, 64QAM |
|   | $1^{st}$ DMRS port, 64QAM |
|   | $2^{nd}$ DMRS port, non-paired |
| 24 | $0^{th}$ DMRS port, 256QAM |
|   | $1^{st}$ DMRS port, 64QAM |
|   | $2^{nd}$ DMRS port, non-paired |
| 25 | $0^{th}$ DMRS port, QPSK |
|   | $1^{st}$ DMRS port, 256QAM |
|   | $2^{nd}$ DMRS port, non-paired |
| 26 | $0^{th}$ DMRS port, 16QAM |
|   | $1^{st}$ DMRS port, 256QAM |
|   | $2^{nd}$ DMRS port, non-paired |
| 27 | $0^{th}$ DMRS port, 64QAM |
|   | $1^{st}$ DMRS port, 256QAM |
|   | $2^{nd}$ DMRS port, non-paired |
| 28 | $0^{th}$ DMRS port, 256QAM |
|   | $1^{st}$ DMRS port, 256QAM |
|   | $2^{nd}$ DMRS port, non-paired |
| 29 | $0^{th}$ DMRS port, QPSK |
|   | $2^{nd}$ DMRS port, QPSK |
|   | $1^{st}$ DMRS port, non-paired |
| 30 | $0^{th}$ DMRS port, 16QAM |
|   | $2^{nd}$ DMRS port, QPSK |
|   | $1^{st}$ DMRS port, non-paired |
| 31 | $0^{th}$ DMRS port, 64QAM |
|   | $2^{nd}$ DMRS port, QPSK |
|   | $1^{st}$ DMRS port, non-paired |

TABLE X1-continued

| Value corresponding to a bit | Indicated meaning |
|---|---|
| 32 | $0^{th}$ DMRS port, 256QAM<br>$2^{nd}$ DMRS port, QPSK<br>$1^{st}$ DMRS port, non-paired |
| 33 | $0^{th}$ DMRS port, QPSK<br>$2^{nd}$ DMRS port, 16QAM<br>$1^{st}$ DMRS port, non-paired |
| 34 | $0^{th}$ DMRS port, 16QAM<br>$2^{nd}$ DMRS port, 16QAM<br>$1^{st}$ DMRS port, non-paired |
| 35 | $0^{th}$ DMRS port, 64QAM<br>$2^{nd}$ DMRS port, 16QAM<br>$1^{st}$ DMRS port, non-paired |
| 36 | $0^{th}$ DMRS port, 256QAM<br>$2^{nd}$ DMRS port, 16QAM<br>$1^{st}$ DMRS port, non-paired |
| 37 | $0^{th}$ DMRS port, QPSK<br>$2^{nd}$ DMRS port, 64QAM<br>$1^{st}$ DMRS port, non-paired |
| 38 | $0^{th}$ DMRS port, 16QAM<br>$2^{nd}$ DMRS port, 64QAM<br>$1^{st}$ DMRS port, non-paired |
| 39 | $0^{th}$ DMRS port, 64QAM<br>$2^{nd}$ DMRS port, 64QAM<br>$1^{st}$ DMRS port, non-paired |
| 40 | $0^{th}$ DMRS port, 256QAM<br>$2^{nd}$ DMRS port, 64QAM<br>$1^{st}$ DMRS port, non-paired |
| 41 | $0^{th}$ DMRS port, QPSK<br>$2^{nd}$ DMRS port, 256QAM<br>$1^{st}$ DMRS port, non-paired |
| 42 | $0^{th}$ DMRS port, 16QAM<br>$2^{nd}$ DMRS port, 256QAM<br>$1^{st}$ DMRS port, non-paired |
| 43 | $0^{th}$ DMRS port, 64QAM<br>$2^{nd}$ DMRS port, 256QAM<br>$1^{st}$ DMRS port, non-paired |
| 44 | $0^{th}$ DMRS port, 256QAM<br>$2^{nd}$ DMRS port, 256QAM<br>$1^{st}$ DMRS port, non-paired |
| 45 | $1^{st}$ DMRS port, QPSK<br>$2^{nd}$ DMRS port, QPSK<br>$0^{th}$ DMRS port, non-paired |
| 46 | $1^{st}$ DMRS port, 16QAM<br>$2^{nd}$ DMRS port, QPSK<br>$0^{th}$ DMRS port, non-paired |
| 47 | $1^{st}$ DMRS port, 64QAM<br>$2^{nd}$ DMRS port, QPSK<br>$0^{th}$ DMRS port, non-paired |
| 48 | $1^{st}$ DMRS port, 256QAM<br>$2^{nd}$ DMRS port, QPSK<br>$0^{th}$ DMRS port, non-paired |
| 49 | $1^{st}$ DMRS port, QPSK<br>$2^{nd}$ DMRS port, 16QAM<br>$0^{th}$ DMRS port, non-paired |
| 50 | $1^{st}$ DMRS port, 16QAM<br>$2^{nd}$ DMRS port, 16QAM<br>$0^{th}$ DMRS port, non-paired |
| 51 | $1^{st}$ DMRS port, 64QAM<br>$2^{nd}$ DMRS port, 16QAM<br>$0^{th}$ DMRS port, non-paired |
| 52 | $1^{st}$ DMRS port, 256QAM<br>$2^{nd}$ DMRS port, 16QAM<br>$0^{th}$ DMRS port, non-paired |
| 53 | $1^{st}$ DMRS port, QPSK<br>$2^{nd}$ DMRS port, 64QAM<br>$0^{th}$ DMRS port, non-paired |
| 54 | $1^{st}$ DMRS port, 16QAM<br>$2^{nd}$ DMRS port, 64QAM<br>$0^{th}$ DMRS port, non-paired |
| 55 | $1^{st}$ DMRS port, 64QAM<br>$2^{nd}$ DMRS port, 64QAM<br>$0^{th}$ DMRS port, non-paired |
| 56 | $1^{st}$ DMRS port, 256QAM<br>$2^{nd}$ DMRS port, 64QAM<br>$0^{th}$ DMRS port, non-paired |
| 57 | $1^{st}$ DMRS port, QPSK<br>$2^{nd}$ DMRS port, 256QAM<br>$0^{th}$ DMRS port, non-paired |
| 58 | $1^{st}$ DMRS port, 16QAM<br>$2^{nd}$ DMRS port, 256QAM<br>$0^{th}$ DMRS port, non-paired |
| 59 | $1^{st}$ DMRS port, 64QAM<br>$2^{nd}$ DMRS port, 256QAM<br>$0^{th}$ DMRS port, non-paired |
| 60 | $1^{st}$ DMRS port, 256QAM<br>$2^{nd}$ DMRS port, 256QAM<br>$0^{th}$ DMRS port, non-paired |
| 61 | $0^{th}$ DMRS port, QPSK<br>$1^{st}$ DMRS port, QPSK<br>$2^{nd}$ DMRS port, QPSK |
| 62 | $0^{th}$ DMRS port, 16QAM<br>$1^{st}$ DMRS port, QPSK<br>$2^{nd}$ DMRS port, QPSK |
| 63 | $0^{th}$ DMRS port, 64QAM<br>$1^{st}$ DMRS port, QPSK<br>$2^{nd}$ DMRS port, QPSK |
| 64 | $0^{th}$ DMRS port, 256QAM<br>$1^{st}$ DMRS port, QPSK<br>$2^{nd}$ DMRS port, QPSK |
| 65 | $0^{th}$ DMRS port, QPSK<br>$1^{st}$ DMRS port, 16QAM<br>$2^{nd}$ DMRS port, QPSK |
| 66 | $0^{th}$ DMRS port, 16QAM<br>$1^{st}$ DMRS port, 16QAM<br>$2^{nd}$ DMRS port, QPSK |
| 67 | $0^{th}$ DMRS port, 64QAM<br>$1^{st}$ DMRS port, 16QAM<br>$2^{nd}$ DMRS port, QPSK |
| 68 | $0^{th}$ DMRS port, 256QAM<br>$1^{st}$ DMRS port, 16QAM<br>$2^{nd}$ DMRS port, QPSK |
| 69 | $0^{th}$ DMRS port, QPSK<br>$1^{st}$ DMRS port, 64QAM<br>$2^{nd}$ DMRS port, QPSK |
| 70 | $0^{th}$ DMRS port, 16QAM<br>$1^{st}$ DMRS port, 64QAM<br>$2^{nd}$ DMRS port, QPSK |
| 71 | $0^{th}$ DMRS port, 64QAM<br>$1^{st}$ DMRS port, 64QAM<br>$2^{nd}$ DMRS port, QPSK |
| 72 | $0^{th}$ DMRS port, 256QAM<br>$1^{st}$ DMRS port, 64QAM<br>$2^{nd}$ DMRS port, QPSK |
| 73 | $0^{th}$ DMRS port, QPSK<br>$1^{st}$ DMRS port, 256QAM<br>$2^{nd}$ DMRS port, QPSK |
| 74 | $0^{th}$ DMRS port, 16QAM<br>$1^{st}$ DMRS port, 256QAM<br>$2^{nd}$ DMRS port, QPSK |
| 75 | $0^{th}$ DMRS port, 64QAM<br>$1^{st}$ DMRS port, 256QAM<br>$2^{nd}$ DMRS port, QPSK |
| 76 | $0^{th}$ DMRS port, 256QAM<br>$1^{st}$ DMRS port, 256QAM<br>$2^{nd}$ DMRS port, QPSK |
| 77 | $0^{th}$ DMRS port, QPSK<br>$1^{st}$ DMRS port, QPSK<br>$2^{nd}$ DMRS port, 16QAM |
| 78 | $0^{th}$ DMRS port, 16QAM<br>$1^{st}$ DMRS port, QPSK<br>$2^{nd}$ DMRS port, 16QAM |
| 79 | $0^{th}$ DMRS port, 64QAM<br>$1^{st}$ DMRS port, QPSK<br>$2^{nd}$ DMRS port, 16QAM |
| 80 | $0^{th}$ DMRS port, 256QAM<br>$1^{st}$ DMRS port, QPSK<br>$2^{nd}$ DMRS port, 16QAM |
| 81 | $0^{th}$ DMRS port, QPSK<br>$1^{st}$ DMRS port, 16QAM<br>$2^{nd}$ DMRS port, 16QAM |
| 82 | $0^{th}$ DMRS port, 16QAM<br>$1^{st}$ DMRS port, 16QAM<br>$2^{nd}$ DMRS port, 16QAM |
| 83 | $0^{th}$ DMRS port, 64QAM<br>$1^{st}$ DMRS port, 16QAM<br>$2^{nd}$ DMRS port, 16QAM |

TABLE X1-continued

| Value corresponding to a bit | Indicated meaning |
|---|---|
| 84 | $0^{th}$ DMRS port, 256QAM<br>$1^{st}$ DMRS port, 16QAM<br>$2^{nd}$ DMRS port, 16QAM |
| 85 | $0^{th}$ DMRS port, QPSK<br>$1^{st}$ DMRS port, 64QAM<br>$2^{nd}$ DMRS port, 16QAM |
| 86 | $0^{th}$ DMRS port, 16QAM<br>$1^{st}$ DMRS port, 64QAM<br>$2^{nd}$ DMRS port, 16QAM |
| 87 | $0^{th}$ DMRS port, 64QAM<br>$1^{st}$ DMRS port, 64QAM<br>$2^{nd}$ DMRS port, 16QAM |
| 88 | $0^{th}$ DMRS port, 256QAM<br>$1^{st}$ DMRS port, 64QAM<br>$2^{nd}$ DMRS port, 16QAM |
| 89 | $0^{th}$ DMRS port, QPSK<br>$1^{st}$ DMRS port, 256QAM<br>$2^{nd}$ DMRS port, 16QAM |
| 90 | $0^{th}$ DMRS port, 16QAM<br>$1^{st}$ DMRS port, 256QAM<br>$2^{nd}$ DMRS port, 16QAM |
| 91 | $0^{th}$ DMRS port, 64QAM<br>$1^{st}$ DMRS port, 256QAM<br>$2^{nd}$ DMRS port, 16QAM |
| 92 | $0^{th}$ DMRS port, 256QAM<br>$1^{st}$ DMRS port, 256QAM<br>$2^{nd}$ DMRS port, 16QAM |
| 93 | $0^{th}$ DMRS port, QPSK<br>$1^{st}$ DMRS port, QPSK<br>$2^{nd}$ DMRS port, 64QAM |
| 94 | $0^{th}$ DMRS port, 16QAM<br>$1^{st}$ DMRS port, QPSK<br>$2^{nd}$ DMRS port, 64QAM |
| 95 | $0^{th}$ DMRS port, 64QAM<br>$1^{st}$ DMRS port, QPSK<br>$2^{nd}$ DMRS port, 64QAM |
| 96 | $0^{th}$ DMRS port, 256QAM<br>$1^{st}$ DMRS port, QPSK<br>$2^{nd}$ DMRS port, 64QAM |
| 97 | $0^{th}$ DMRS port, QPSK<br>$1^{st}$ DMRS port, 16QAM<br>$2^{nd}$ DMRS port, 64QAM |
| 98 | $0^{th}$ DMRS port, 16QAM<br>$1^{st}$ DMRS port, 16QAM<br>$2^{nd}$ DMRS port, 64QAM |
| 99 | $0^{th}$ DMRS port, 64QAM<br>$1^{st}$ DMRS port, 16QAM<br>$2^{nd}$ DMRS port, 64QAM |
| 100 | $0^{th}$ DMRS port, 256QAM<br>$1^{st}$ DMRS port, 16QAM<br>$2^{nd}$ DMRS port, 64QAM |
| 101 | $0^{th}$ DMRS port, QPSK<br>$1^{st}$ DMRS port, 64QAM<br>$2^{nd}$ DMRS port, 64QAM |
| 102 | $0^{th}$ DMRS port, 16QAM<br>$1^{st}$ DMRS port, 64QAM<br>$2^{nd}$ DMRS port, 64QAM |
| 103 | $0^{th}$ DMRS port, 64QAM<br>$1^{st}$ DMRS port, 64QAM<br>$2^{nd}$ DMRS port, 64QAM |
| 104 | $0^{th}$ DMRS port, 256QAM<br>$1^{st}$ DMRS port, 64QAM<br>$2^{nd}$ DMRS port, 64QAM |
| 105 | $0^{th}$ DMRS port, QPSK<br>$1^{st}$ DMRS port, 256QAM<br>$2^{nd}$ DMRS port, 64QAM |
| 106 | $0^{th}$ DMRS port, 16QAM<br>$1^{st}$ DMRS port, 256QAM<br>$2^{nd}$ DMRS port, 64QAM |
| 107 | $0^{th}$ DMRS port, 64QAM<br>$1^{st}$ DMRS port, 256QAM<br>$2^{nd}$ DMRS port, 64QAM |
| 108 | $0^{th}$ DMRS port, 256QAM<br>$1^{st}$ DMRS port, 256QAM<br>$2^{nd}$ DMRS port, 64QAM |
| 109 | $0^{th}$ DMRS port, QPSK<br>$1^{st}$ DMRS port, QPSK<br>$2^{nd}$ DMRS port, 256QAM |
| 110 | $0^{th}$ DMRS port, 16QAM<br>$1^{st}$ DMRS port, QPSK<br>$2^{nd}$ DMRS port, 256QAM |
| 111 | $0^{th}$ DMRS port, 64QAM<br>$1^{st}$ DMRS port, QPSK<br>$2^{nd}$ DMRS port, 256QAM |
| 112 | $0^{th}$ DMRS port, 256QAM<br>$1^{st}$ DMRS port, QPSK<br>$2^{nd}$ DMRS port, 256QAM |
| 113 | $0^{th}$ DMRS port, QPSK<br>$1^{st}$ DMRS port, 16QAM<br>$2^{nd}$ DMRS port, 256QAM |
| 114 | $0^{th}$ DMRS port, 16QAM<br>$1^{st}$ DMRS port, 16QAM<br>$2^{nd}$ DMRS port, 256QAM |
| 115 | $0^{th}$ DMRS port, 64QAM<br>$1^{st}$ DMRS port, 16QAM<br>$2^{nd}$ DMRS port, 256QAM |
| 116 | $0^{th}$ DMRS port, 256QAM<br>$1^{st}$ DMRS port, 16QAM<br>$2^{nd}$ DMRS port, 256QAM |
| 117 | $0^{th}$ DMRS port, QPSK<br>$1^{st}$ DMRS port, 64QAM<br>$2^{nd}$ DMRS port, 256QAM |
| 118 | $0^{th}$ DMRS port, 16QAM<br>$1^{st}$ DMRS port, 64QAM<br>$2^{nd}$ DMRS port, 256QAM |
| 119 | $0^{th}$ DMRS port, 64QAM<br>$1^{st}$ DMRS port, 64QAM<br>$2^{nd}$ DMRS port, 256QAM |
| 120 | $0^{th}$ DMRS port, 256QAM<br>$1^{st}$ DMRS port, 64QAM<br>$2^{nd}$ DMRS port, 256QAM |
| 121 | $0^{th}$ DMRS port, QPSK<br>$1^{st}$ DMRS port, 256QAM<br>$2^{nd}$ DMRS port, 256QAM |
| 122 | $0^{th}$ DMRS port, 16QAM<br>$1^{st}$ DMRS port, 256QAM<br>$2^{nd}$ DMRS port, 256QAM |
| 123 | $0^{th}$ DMRS port, 64QAM<br>$1^{st}$ DMRS port, 256QAM<br>$2^{nd}$ DMRS port, 256QAM |
| 124 | $0^{th}$ DMRS port, 256QAM<br>$1^{st}$ DMRS port, 256QAM<br>$2^{nd}$ DMRS port, 256QAM |
| 125 to 127 | Reserved |

TABLE X2

| Value corresponding to a bit | Indicated meaning |
|---|---|
| 0 | Non-paired transmission |
| 1 | $0^{th}$ DMRS port, QPSK<br>$1^{st}$ DMRS port, non-paired<br>$2^{nd}$ DMRS port, non-paired |
| 2 | $0^{th}$ DMRS port, 16QAM<br>$1^{st}$ DMRS port, non-paired<br>$2^{nd}$ DMRS port, non-paired |
| 3 | $0^{th}$ DMRS port, 64QAM<br>$1^{st}$ DMRS port, non-paired<br>$2^{nd}$ DMRS port, non-paired |
| 4 | $0^{th}$ DMRS port, non-paired<br>$1^{st}$ DMRS port, QPSK<br>$2^{nd}$ DMRS port, non-paired |
| 5 | $0^{th}$ DMRS port, QPSK<br>$1^{st}$ DMRS port, QPSK<br>$2^{nd}$ DMRS port, non-paired |
| 6 | $0^{th}$ DMRS port, 16QAM<br>$1^{st}$ DMRS port, QPSK<br>$2^{nd}$ DMRS port, non-paired |
| 7 | $0^{th}$ DMRS port, 64QAM<br>$1^{st}$ DMRS port, QPSK<br>$2^{nd}$ DMRS port, non-paired |

TABLE X2-continued

| Value corresponding to a bit | Indicated meaning |
|---|---|
| 8 | $0^{th}$ DMRS port, non-paired<br>$1^{st}$ DMRS port, 16QAM<br>$2^{nd}$ DMRS port, non-paired |
| 9 | $0^{th}$ DMRS port, QPSK<br>$1^{st}$ DMRS port, 16QAM<br>$2^{nd}$ DMRS port, non-paired |
| 10 | $0^{th}$ DMRS port, 16QAM<br>$1^{st}$ DMRS port, 16QAM<br>$2^{nd}$ DMRS port, non-paired |
| 11 | $0^{th}$ DMRS port, 64QAM<br>$1^{st}$ DMRS port, 16QAM<br>$2^{nd}$ DMRS port, non-paired |
| 12 | $0^{th}$ DMRS port, non-paired<br>$1^{st}$ DMRS port, 64QAM<br>$2^{nd}$ DMRS port, non-paired |
| 13 | $0^{th}$ DMRS port, QPSK<br>$1^{st}$ DMRS port, 64QAM<br>$2^{nd}$ DMRS port, non-paired |
| 14 | $0^{th}$ DMRS port, 16QAM<br>$1^{st}$ DMRS port, 64QAM<br>$2^{nd}$ DMRS port, non-paired |
| 15 | $0^{th}$ DMRS port, 64QAM<br>$1^{st}$ DMRS port, 64QAM<br>$2^{nd}$ DMRS port, non-paired |
| 16 | $0^{th}$ DMRS port, non-paired<br>$1^{st}$ DMRS port, non-paired<br>$2^{nd}$ DMRS port, QPSK |
| 17 | $0^{th}$ DMRS port, QPSK<br>$1^{st}$ DMRS port, non-paired<br>$2^{nd}$ DMRS port, QPSK |
| 18 | $0^{th}$ DMRS port, 16QAM<br>$1^{st}$ DMRS port, non-paired<br>$2^{nd}$ DMRS port, QPSK |
| 19 | $0^{th}$ DMRS port, 64QAM<br>$1^{st}$ DMRS port, non-paired<br>$2^{nd}$ DMRS port, QPSK |
| 20 | $0^{th}$ DMRS port, non-paired<br>$1^{st}$ DMRS port, QPSK<br>$2^{nd}$ DMRS port, QPSK |
| 21 | $0^{th}$ DMRS port, QPSK<br>$1^{st}$ DMRS port, QPSK<br>$2^{nd}$ DMRS port, QPSK |
| 22 | $0^{th}$ DMRS port, 16QAM<br>$1^{st}$ DMRS port, QPSK<br>$2^{nd}$ DMRS port, QPSK |
| 23 | $0^{th}$ DMRS port, 64QAM<br>$1^{st}$ DMRS port, QPSK<br>$2^{nd}$ DMRS port, QPSK |
| 24 | $0^{th}$ DMRS port, non-paired<br>$1^{st}$ DMRS port, 16QAM<br>$2^{nd}$ DMRS port, QPSK |
| 25 | $0^{th}$ DMRS port, QPSK<br>$1^{st}$ DMRS port, 16QAM<br>$2^{nd}$ DMRS port, QPSK |
| 26 | $0^{th}$ DMRS port, 16QAM<br>$1^{st}$ DMRS port, 16QAM<br>$2^{nd}$ DMRS port, QPSK |
| 27 | $0^{th}$ DMRS port, 64QAM<br>$1^{st}$ DMRS port, 16QAM<br>$2^{nd}$ DMRS port, QPSK |
| 28 | $0^{th}$ DMRS port, non-paired<br>$1^{st}$ DMRS port, 64QAM<br>$2^{nd}$ DMRS port, QPSK |
| 29 | $0^{th}$ DMRS port, QPSK<br>$1^{st}$ DMRS port, 64QAM<br>$2^{nd}$ DMRS port, QPSK |
| 30 | $0^{th}$ DMRS port, 16QAM<br>$1^{st}$ DMRS port, 64QAM<br>$2^{nd}$ DMRS port, QPSK |
| 31 | $0^{th}$ DMRS port, 64QAM<br>$1^{st}$ DMRS port, 64QAM<br>$2^{nd}$ DMRS port, QPSK |
| 32 | $0^{th}$ DMRS port, non-paired<br>$1^{st}$ DMRS port, non-paired<br>$2^{nd}$ DMRS port, 16QAM |
| 33 | $0^{th}$ DMRS port, QPSK<br>$1^{st}$ DMRS port, non-paired<br>$2^{nd}$ DMRS port, 16QAM |
| 34 | $0^{th}$ DMRS port, 16QAM<br>$1^{st}$ DMRS port, non-paired<br>$2^{nd}$ DMRS port, 16QAM |
| 35 | $0^{th}$ DMRS port, 64QAM<br>$1^{st}$ DMRS port, non-paired<br>$2^{nd}$ DMRS port, 16QAM |
| 36 | $0^{th}$ DMRS port, non-paired<br>$1^{st}$ DMRS port, QPSK<br>$2^{nd}$ DMRS port, 16QAM |
| 37 | $0^{th}$ DMRS port, QPSK<br>$1^{st}$ DMRS port, QPSK<br>$2^{nd}$ DMRS port, 16QAM |
| 38 | $0^{th}$ DMRS port, 16QAM<br>$1^{st}$ DMRS port, QPSK<br>$2^{nd}$ DMRS port, 16QAM |
| 39 | $0^{th}$ DMRS port, 64QAM<br>$1^{st}$ DMRS port, QPSK<br>$2^{nd}$ DMRS port, 16QAM |
| 40 | $0^{th}$ DMRS port, non-paired<br>$1^{st}$ DMRS port, 16QAM<br>$2^{nd}$ DMRS port, 16QAM |
| 41 | $0^{th}$ DMRS port, QPSK<br>$1^{st}$ DMRS port, 16QAM<br>$2^{nd}$ DMRS port, 16QAM |
| 42 | $0^{th}$ DMRS port, 16QAM<br>$1^{st}$ DMRS port, 16QAM<br>$2^{nd}$ DMRS port, 16QAM |
| 43 | $0^{th}$ DMRS port, 64QAM<br>$1^{st}$ DMRS port, 16QAM<br>$2^{nd}$ DMRS port, 16QAM |
| 44 | $0^{th}$ DMRS port, non-paired<br>$1^{st}$ DMRS port, 64QAM<br>$2^{nd}$ DMRS port, 16QAM |
| 45 | $0^{th}$ DMRS port, QPSK<br>$1^{st}$ DMRS port, 64QAM<br>$2^{nd}$ DMRS port, 16QAM |
| 46 | $0^{th}$ DMRS port, 16QAM<br>$1^{st}$ DMRS port, 64QAM<br>$2^{nd}$ DMRS port, 16QAM |
| 47 | $0^{th}$ DMRS port, 64QAM<br>$1^{st}$ DMRS port, 64QAM<br>$2^{nd}$ DMRS port, 16QAM |
| 48 | $0^{th}$ DMRS port, non-paired<br>$1^{st}$ DMRS port, non-paired<br>$2^{nd}$ DMRS port, 64QAM |
| 49 | $0^{th}$ DMRS port, QPSK<br>$1^{st}$ DMRS port, non-paired<br>$2^{nd}$ DMRS port, 64QAM |
| 50 | $0^{th}$ DMRS port, 16QAM<br>$1^{st}$ DMRS port, non-paired<br>$2^{nd}$ DMRS port, 64QAM |
| 51 | $0^{th}$ DMRS port, 64QAM<br>$1^{st}$ DMRS port, non-paired<br>$2^{nd}$ DMRS port, 64QAM |
| 52 | $0^{th}$ DMRS port, non-paired<br>$1^{st}$ DMRS port, QPSK<br>$2^{nd}$ DMRS port, 64QAM |
| 53 | $0^{th}$ DMRS port, QPSK<br>$1^{st}$ DMRS port, QPSK<br>$2^{nd}$ DMRS port, 64QAM |
| 54 | $0^{th}$ DMRS port, 16QAM<br>$1^{st}$ DMRS port, QPSK<br>$2^{nd}$ DMRS port, 64QAM |
| 55 | $0^{th}$ DMRS port, 64QAM<br>$1^{st}$ DMRS port, QPSK<br>$2^{nd}$ DMRS port, 64QAM |
| 56 | $0^{th}$ DMRS port, non-paired<br>$1^{st}$ DMRS port, 16QAM<br>$2^{nd}$ DMRS port, 64QAM |
| 57 | $0^{th}$ DMRS port, QPSK<br>$1^{st}$ DMRS port, 16QAM<br>$2^{nd}$ DMRS port, 64QAM |
| 58 | $0^{th}$ DMRS port, 16QAM<br>$1^{st}$ DMRS port, 16QAM<br>$2^{nd}$ DMRS port, 64QAM |
| 59 | $0^{th}$ DMRS port, 64QAM<br>$1^{st}$ DMRS port, 16QAM<br>$2^{nd}$ DMRS port, 64QAM |

TABLE X2-continued

| Value corresponding to a bit | Indicated meaning |
|---|---|
| 60 | $0^{th}$ DMRS port, non-paired |
|  | $1^{st}$ DMRS port, 64QAM |
|  | $2^{nd}$ DMRS port, 64QAM |
| 61 | $0^{th}$ DMRS port, QPSK |
|  | $1^{st}$ DMRS port, 64QAM |
|  | $2^{nd}$ DMRS port, 64QAM |
| 62 | $0^{th}$ DMRS port, 16QAM |
|  | $1^{st}$ DMRS port, 64QAM |
|  | $2^{nd}$ DMRS port, 64QAM |
| 63 | $0^{th}$ DMRS port, 64QAM |
|  | $1^{st}$ DMRS port, 64QAM |
|  | $2^{nd}$ DMRS port, 64QAM |

TABLE X3

| Value corresponding to a bit | Indicated meaning |
|---|---|
| 0 | Non-paired transmission |
| 1 | $0^{th}$ DMRS port, QPSK |
|  | $1^{st}$ DMRS port, non-paired |
| 2 | $0^{th}$ DMRS port, 16QAM |
|  | $1^{st}$ DMRS port, non-paired |
| 3 | $0^{th}$ DMRS port, 64QAM |
|  | $1^{st}$ DMRS port, non-paired |
| 4 | $0^{th}$ DMRS port, 256QAM |
|  | $1^{st}$ DMRS port, non-paired |
| 5 | $1^{st}$ DMRS port, QPSK |
|  | $0^{th}$ DMRS port, non-paired |
| 6 | $1^{st}$ DMRS port, 16QAM |
|  | $0^{th}$ DMRS port, non-paired |
| 7 | $1^{st}$ DMRS port, 64QAM |
|  | $0^{th}$ DMRS port, non-paired |
| 8 | $1^{st}$ DMRS port, 256QAM |
|  | $0^{th}$ DMRS port, non-paired |
| 9 | $0^{th}$ DMRS port, QPSK |
|  | $1^{st}$ DMRS port, QPSK |
| 10 | $0^{th}$ DMRS port, 16QAM |
|  | $1^{st}$ DMRS port, QPSK |
| 11 | $0^{th}$ DMRS port, 64QAM |
|  | $1^{st}$ DMRS port, QPSK |
| 12 | $0^{th}$ DMRS port, 256QAM |
|  | $1^{st}$ DMRS port, QPSK |
| 13 | $0^{th}$ DMRS port, QPSK |
|  | $1^{st}$ DMRS port, 16QAM |
| 14 | $0^{th}$ DMRS port, 16QAM |
|  | $1^{st}$ DMRS port, 16QAM |
| 15 | $0^{th}$ DMRS port, 64QAM |
|  | $1^{st}$ DMRS port, 16QAM |
| 16 | $0^{th}$ DMRS port, 256QAM |
|  | $1^{st}$ DMRS port, 16QAM |
| 17 | $0^{th}$ DMRS port, QPSK |
|  | $1^{st}$ DMRS port, 64QAM |
| 18 | $0^{th}$ DMRS port, 16QAM |
|  | $1^{st}$ DMRS port, 64QAM |
| 19 | $0^{th}$ DMRS port, 64QAM |
|  | $1^{st}$ DMRS port, 64QAM |
| 20 | $0^{th}$ DMRS port, 256QAM |
|  | $1^{st}$ DMRS port, 64QAM |
| 21 | $0^{th}$ DMRS port, QPSK |
|  | $1^{st}$ DMRS port, 256QAM |
| 22 | $0^{th}$ DMRS port, 16QAM |
|  | $1^{st}$ DMRS port, 256QAM |
| 23 | $0^{th}$ DMRS port, 64QAM |
|  | $1^{st}$ DMRS port, 256QAM |
| 24 | $0^{th}$ DMRS port, 256QAM |
|  | $1^{st}$ DMRS port, 256QAM |
| 25 to 31 | Reserved |

TABLE X4

| Value corresponding to a bit | Indicated meaning |
|---|---|
| 0 | Non-paired transmission |
| 1 | $0^{th}$ DMRS port, QPSK |
|  | $1^{st}$ DMRS port, non-paired |
| 2 | $0^{th}$ DMRS port, 16QAM |
|  | $1^{st}$ DMRS port, non-paired |
| 3 | $0^{th}$ DMRS port, 64QAM |
|  | $1^{st}$ DMRS port, non-paired |
| 4 | $0^{th}$ DMRS port, non-paired |
|  | $1^{st}$ DMRS port, QPSK |
| 5 | $0^{th}$ DMRS port, QPSK |
|  | $1^{st}$ DMRS port, QPSK |
| 6 | $0^{th}$ DMRS port, 16QAM |
|  | $1^{st}$ DMRS port, QPSK |
| 7 | $0^{th}$ DMRS port, 64QAM |
|  | $1^{st}$ DMRS port, QPSK |
| 8 | $0^{th}$ DMRS port, non-paired |
|  | $1^{st}$ DMRS port, 16QAM |
| 9 | $0^{th}$ DMRS port, QPSK |
|  | $1^{st}$ DMRS port, 16QAM |
| 10 | $0^{th}$ DMRS port, 16QAM |
|  | $1^{st}$ DMRS port, 16QAM |
| 11 | $0^{th}$ DMRS port, 64QAM |
|  | $1^{st}$ DMRS port, 16QAM |
| 12 | $0^{th}$ DMRS port, non-paired |
|  | $1^{st}$ DMRS port, 64QAM |
| 13 | $0^{th}$ DMRS port, QPSK |
|  | $1^{st}$ DMRS port, 64QAM |
| 14 | $0^{th}$ DMRS port, 16QAM |
|  | $1^{st}$ DMRS port, 64QAM |
| 15 | $0^{th}$ DMRS port, 64QAM |
|  | $1^{st}$ DMRS port, 64QAM |

TABLE X5

| Value corresponding to a bit | Indicated meaning |
|---|---|
| 0 | Non-paired transmission |
| 1 | QPSK |
| 2 | 16QAM |
| 3 | 64QAM |
| 4 | 256QAM |
| 5 | Reserved |
| 6 | Reserved |
| 7 | Reserved |

It should be noted that, the $0^{th}/1^{st}/2^{nd}$ DMRS port in the foregoing tables represents an index of the DMRS port of the paired terminal, and the index of the DMRS port of the paired terminal may correspond to different DMRS ports according to different DMRS ports allocated by the base station to the terminal.

According to the method, the information indicating the terminal type corresponding to the transmission mode is transferred, so that the terminal can learn of transmission mode information, and the terminal can perform corresponding processing according to the transmission mode, thereby improving processing efficiency. For example, the terminal may select an adaptive receiving algorithm to demodulate a signal, to improve demodulation efficiency and accuracy.

Further, after learning of the transmission mode information, the terminal may further determine downlink data transmit power according to a corresponding transmission mode. To enable the terminal to obtain the downlink data transmit power, this embodiment of the present invention may further include the following step:

S203. The base station notifies the terminal of a power parameter used to determine downlink data transmit power.

Both a terminal in the paired transmission mode and a terminal in the non-paired transmission mode can receive a power parameter that is sent by the base station and that is used to determine downlink data transmit power. The power parameter may include $PA_{MUST}$.

$PA_{MUST}$ may be an existing parameter in an existing protocol, for example, may be $P_A$ in a section 5.2 of 3GPP TS 36.213 V12.3.0 (2014.09). Alternatively, $PA_{MUST}$ may be considered as a new understanding of an existing parameter $P_A$ in A the existing protocol, that is, $PA_{MUST}$ is sent to the terminal in a same manner as $P_A$, but a value of $PA_{MUST}$ may be different from that of the existing $P_A$. Alternatively, $PA_{MUST}$ may be a newly defined parameter and different from $P_A$. In addition to sending $P_A$ already defined in the existing protocol, the base station sends $PA_{MUST}$. In this case, the power parameter that is notified by the base station to the terminal and that is used to determine the downlink data transmit power includes $PA_{MUST}$ and $P_A$. $PA_{MUST}$ may be a cell-level parameter, that is, all terminals in a cell receive a parameter $PA_{MUST}$ of a same value. Alternatively, $PA_{MUST}$ may be a separate parameter for a pair of paired transmission terminals, that is, each pair of paired transmission terminals is notified of a separate $PA_{MUST}$.

In addition, a same power parameter $PA_{MUST}$ may be sent to a pair of terminals in the paired transmission mode. When notifying the power parameter, the base station may deliver an index corresponding to a specific parameter, so that the terminal can learn of the specific parameter according to the index. Alternatively, the power parameter may be notified in another manner. This is not limited in this embodiment of the present invention provided that the base station can notify the terminal of the power parameter used to determine the downlink data transmit power.

In addition, the base station may notify all terminal pairs in the paired transmission mode in a cell of a same $PA_{MUST}$, or may notify each pair of paired transmission terminals of a separate $PA_{MUST}$. $PA_{MUST}$ values of different pairs of terminals in the paired transmission mode may be equal or unequal. Specifically, the base station may semi-statically notify the terminal of $PA_{MUST}$, for example, send $PA_{MUST}$ to the terminal by using broadcast signaling or radio resource control (RRC) signaling.

If $PA_{MUST}$ is semi-statically sent to the terminal, S203 may be performed before S201.

In the foregoing embodiment, the base station notifies the terminal of $PA_{MUST}$, so that the terminal can learn of the downlink data transmit power, thereby improving reliability of data demodulation performed by the terminal and reducing complexity of data demodulation performed by the terminal.

In addition, after the terminal demodulates data by using the information that indicates the terminal type corresponding to the transmission mode and that is sent by the base station, the base station may receive information that indicates whether demodulation succeeds and that is fed back by the terminal. Based on the foregoing embodiment, this embodiment of the present invention may further include the following step:

S204. The base station receives feedback information sent by the terminal, where the feedback information is information that indicates whether demodulation succeeds and that is fed back by the terminal after the terminal performs demodulation based on the information indicating the terminal type corresponding to the transmission mode, the power parameter used to determine the downlink data transmit power, and energy per resource element of a cell-specific reference signal, or the feedback information is information that indicates whether demodulation succeeds and that is fed back by the terminal after the terminal performs demodulation based on the information indicating the terminal type corresponding to the transmission mode, downlink data transmit power ratio/coefficient information, the power parameter used to determine the downlink data transmit power, and energy per resource element of a cell-specific reference signal.

For ease of description, in this specification, a downlink data transmit power ratio/coefficient of a terminal in the paired transmission mode is briefly referred to as a downlink data transmit power ratio/coefficient.

It should be noted that, a specific manner of the information that indicates whether demodulation succeeds and that is fed back by the terminal after the terminal performs demodulation is subsequently described in detail in this embodiment of the present invention.

Further, the base station may semi-statically or dynamically send a downlink data transmit power ratio/coefficient of the terminal in the paired transmission mode or a downlink data transmit power ratio/coefficient set of the terminal in the paired transmission mode to the terminal, or may preset and store, in the terminal, a downlink data transmit power ratio/coefficient of the terminal in the paired transmission mode or a downlink data transmit power ratio/coefficient set of the terminal in the paired transmission mode. This is not limited in this embodiment of the present invention.

For ease of description, the downlink data transmit power ratio/coefficient of the terminal in the paired transmission mode is briefly referred to as a downlink data transmit power ratio/coefficient below.

Specifically, the downlink data transmit power ratio may be in a normalized form. For example, a ratio of downlink data transmit power of a near terminal to downlink data transmit power of a far terminal=X:Y, or a ratio of downlink data transmit power of a far terminal to downlink data transmit power of a near terminal=Y:X. X and Y are decimals greater than 0 and less than 1, X+Y=1, and X<Y. Alternatively, the downlink data transmit power ratio may be in a non-normalized form. For example, a ratio of downlink data transmit power of a near terminal to downlink data transmit power of a far terminal=A:B, or a ratio of downlink data transmit power of a far terminal to downlink data transmit power of a near terminal=B:A. A and B may be integers or decimals, and A<B. For different forms of the downlink data transmit power ratio, calculation manners in which the terminal determines the downlink data transmit power are slightly different. Details are subsequently described. It may be understood that, the downlink data transmit power ratio may alternatively be in another form. This is not limited in this embodiment of the present invention. The downlink data transmit power of the near terminal usually accounts for a lower proportion in total downlink data transmit power than the downlink data transmit power of the far terminal, so as to further ensure fairness.

For a form of the downlink data transmit power coefficient, a near terminal may have a coefficient $\beta_1$, and a far terminal may have a coefficient $\beta_2$. $\beta_1$ and $\beta_2$ are decimals greater than 0 and less than 1, $\beta_1+\beta_2=1$, and $\beta_1<\beta_2$. In addition, for a terminal in the non-paired transmission mode, it may be understood that the coefficient is 1.

For ease of description, in the following description, the near terminal is denoted as UE 1, the far terminal is denoted as UE 2, and a downlink data transmit power ratio of UE 1 to UE 2 may be denoted as $\beta$.

In addition, when the UE 1 and the UE 2 use a multi-antenna transmission mode and have an equal quantity of transmit spatial layers, $\beta=\beta_1:\beta_2$. $P_1$ is downlink data transmit power of the UE 1 in a non-orthogonal multiple access system, and $P_2$ is downlink data transmit power of the UE 2 in the non-orthogonal multiple access system. Alternatively, when the UE 1 and the UE 2 use a multi-antenna transmission mode and have unequal quantities of transmit spatial layers, for multi-antenna transmission, data may have a plurality of layers. In this case, a downlink data transmit power ratio may be considered according to layers, and a ratio of downlink data transmit power of data of the UE 1 at any layer to downlink data transmit power of paired data of the UE 2 at any layer may be used to denote β. For example, when the UE 1 uses the multi-antenna transmission mode and has two transmit spatial layers, and a transmission mode used by the UE 2 has one transmit spatial layer, the UE 2 may be paired with first-layer data of the UE 1, or may be paired with second-layer data of the UE 1. In this case, $β=P_{1,1}:P_2$ or $β=P_{1,2}:P_2$. $P_{1,1}$ is downlink data transmit power of the first-layer data of the UE 1, and $P_{1,2}$ is downlink data transmit power of the second-layer data of the UE 1.

Specifically, β may have different values according to different requirements. For example, β may be a value in a set {0.1:0.9, 0.15:0.85, 0.2:0.8, 0.25:0.75, 0.3:0.7, 0.35:0.65, 0.4:0.6}, or β may be a value in a set {0.2:0.8,0.25:0.75, 0.3:0.7,0.35:0.65,0.4:0.6}, or β may be a value in a set {0.9:0.1,0.85:0.15,0.8:02}, or β has a fixed value, for example, 0.2:0.8, 10:32, 42:128, 1:16, or 1:20.

Similarly, $β_1$ may be a value in a set {0.2,0.2381,0.2471}, a value in a set {0.10.150.20.250.30.350.4}, {0.2,0.25, 0.30.35,0.4}, or a value in a set {0.1,0.15,0.2}, or may be 0.2, 0.238, 0.247, 0.059, or 0.048. $β_2$ may be a value in a set {0.8,0.7619,0.7529}, a value in a set {0.9,0.85,0.8,0.75,0.7, 0.65,0.6}, a value in a set {0.8,0.75,0.7,0.65,0.6}, or a value in a set {0.9, 0.85, 0.8}, or may be 0.8, 0.762, 0.753, 0.941, or 0.952.

The foregoing are examples for describing several possible sets or specific values of β, $β_1$, and $β_2$, and this embodiment of the present invention is not limited thereto. According to different scenarios, β, $β_1$, and $β_2$ may be selected from different sets or may have other values. It may be understood that, the foregoing single specific value may also be understood as a set. Further, a value may be added to the foregoing sets of β, $β_1$, and $β_2$, and the value is a special value, such as 1. When the value is 1, it indicates that the terminal is in the non-paired transmission mode.

Specifically, a form of determining a downlink data transmit power ratio/coefficient from downlink data transmit power ratio/coefficient sets of two terminals may be understood as a flexible power allocation mode, and a form of using a fixed downlink data transmit power ratio/coefficient may be understood as a fixed power allocation mode.

How to select β is used as an example for description below. Cases for $β_1$ and $β_2$ each is similar to this.

For example, when the flexible power allocation mode is used, β may be selected from {0.1:0.9, 0.15:0.85, 0.2:0.8, 0.25:0.75, 0.3:0.7, 0.35:0.65, 0.4:0.6} or {0.2:0.8, 0.25:0.75, 0.3:0.7, 0.35:0.65, 0.4:0.6}. Based on this, a specific set from which β is selected may be further determined with reference to modulation schemes of downlink data signals sent by the base station to the UE 1 and the UE 2. For example, when the modulation schemes of the downlink data signals sent by the base station to the UE 1 and the UE 2 are both quadrature phase shift keying (QPSK), β may be selected from a set including at least an element 0.2:0.8 or an element equivalent to 0.2:0.8. For example, the set may be {0.1:0.9,0.15:0.85,0.2:0.8,0.25:0.75,0.3:0.7,0.35:0.65, 0.4:0.6}. When a modulation scheme of a downlink signal sent by the base station to the UE 1 is 16 quadrature amplitude modulation (QAM) and a modulation scheme of a downlink signal sent by the base station to the UE 2 is QPSK, β may be selected from the set {0.2:0.8,0.25:0.75, 0.3:0.7,0.35:0.65,0.4:0.6}, or β may be selected from a set including at least an element 10:32 or an element equivalent to 10:32. Alternatively, when the modulation schemes of the downlink signals sent by the base station to the UE 1 and the UE 2 are both 16QAM, β may be selected from a set including at least an element 10:160 or an element equivalent to 10:160.

When the base station uses the fixed power allocation mode, β may have a fixed value. Based on this, a specific β may be further determined with reference to modulation schemes of downlink data signals sent by the base station to the UE 1 and the UE 2. For example, when the modulation schemes of the signals sent by the base station to the UE1 and the UE 2 are both QPSK, β may be 0.2:0.8. When a modulation scheme of a downlink signal sent by the base station to the UE 1 is 16QAM, and a modulation scheme of a signal sent by the base station to the UE 2 is QPSK, β may be 10:32. When a modulation scheme of a signal sent by the base station to the UE 1 is 64QAM, and a modulation scheme of the UE 2 is QPSK, β may be 42:128. Alternatively, when the modulation schemes of the signals sent by the base station to the UE 1 and the UE 2 are both 16QAM, β may be 1:16. When a modulation scheme of a signal sent by the base station to the UE 1 is QPSK, and a modulation scheme of a signal sent by the base station to the UE 2 is 16QAM, β may be 1:20.

It may be understood that, the base station may select a specific β from a set according to factors such as a signal to interference plus noise ratio or a modulation scheme or both of the terminal, so as to ensure fairness. This is not limited in this embodiment of the present invention.

In addition, the base station may determine, according to whether the terminal supports the flexible power allocation mode or the fixed power allocation mode, whether to use the flexible power allocation mode or the fixed power allocation mode, and this is not limited in this embodiment of the present invention.

In this embodiment of the present invention, for example, by receiving the information that indicates whether demodulation succeeds and that is sent by the terminal, the base station can determine whether to retransmit data, so as to improve reliability of data transmission.

Further, in this embodiment of the present invention, as described above, the base station may send the downlink data transmit power ratio/coefficient or the downlink data transmit power ratio/coefficient set to the terminal, or may preset and store, in the terminal, the downlink data transmit power ratio/coefficient or the downlink data transmit power ratio/coefficient set. For ease of description, the downlink data transmit power ratio/coefficient and the downlink data transmit power ratio/coefficient set may be collectively referred to as downlink data transmit power ratio/coefficient information.

The following describes in detail a process in which the base station sends the downlink data transmit power ratio/ coefficient information to the terminal. Based on the foregoing embodiment, this embodiment of the present invention may further include the following step:

S205. The base station sends the downlink data transmit power ratio/coefficient information or indication information of the downlink data transmit power ratio/coefficient information to the terminal.

The base station may directly send the downlink data transmit power ratio/coefficient information to the terminal, or may send the indication information of the downlink data transmit power ratio/coefficient information to the terminal.

There is a correspondence between a specific value of the indication information of the downlink data transmit power ratio/coefficient information and the downlink data transmit power ratio/coefficient information. The terminal can determine, according to the indication information, a specific set from which $\beta$, $\beta_1$, or $\beta_2$ is selected, or the terminal may directly determine a specific value of $\beta$, $\beta_1$, or $\beta_2$ according to the indication information.

The downlink data transmit power ratio/coefficient information or the indication information of the downlink data transmit power ratio/coefficient information may be sent by the base station to the terminal by using higher layer signaling, for example, sent to the terminal by using RRC signaling in a radio resource control (radio resource control, RRC) connection establishment process, or sent by the base station to the terminal by using a broadcast message. It may be understood that, the foregoing manner of performing sending by using the broadcast message or the RRC signaling may be referred to as a semi-static manner. In this case, S205 may be performed before S201.

Alternatively, the downlink data transmit power ratio/coefficient information or the indication information of the downlink data transmit power ratio/coefficient information may be dynamically sent to the terminal, and may be carried in existing signaling (for example, control signaling), or may be transmitted by using dedicated signaling. This is not limited in this embodiment of the present invention. For example, the downlink data transmit power ratio/coefficient information or the indication information of the downlink data transmit power ratio/coefficient information may be added to DCI and sent from the base station to the terminal by using a downlink control channel. In this case, S205 may be performed before S201 and S202, or may be performed synchronously with S201 and S202.

Specifically, a field of at least 1 bit may be used to carry the indication information of the downlink data transmit power ratio/coefficient information. $\beta$ is used as an example. Specifically, for example, a correspondence between a bit value and $\beta$ may be shown in Table 3.

TABLE 3

| Bits | $\beta$ |
| --- | --- |
| 00 | 1 (which indicates a non-paired transmission mode in this case) |
| 01 | 0.1:0.9 |
| 10 | 0.2:0.8 |
| 11 | 0.3:0.7 |

It may be learned that, in Table 3, a bit value "00" is further used to indicate the non-paired transmission mode, that is, in addition to carrying information about $\beta$, the field may implicitly indicate a terminal type corresponding to a transmission mode. That is, when $\beta$ corresponding to a bit value is 1, the field indicates the non-paired transmission mode; or when $\beta$ corresponding to a bit value is a value other than 1, the field indicates the paired transmission mode. It should be noted that, in this embodiment of the present invention, the correspondence between a bit and $\beta$ is not limited to that shown in Table 3, and the correspondence may be specified flexibly. For example, "11" may indicate that $\beta$ is 1.

It may be understood that, a field of more bits may alternatively be used to indicate $\beta$, and the field may not be used to implicitly indicate a terminal type corresponding to a transmission mode. In this way, more pieces of downlink data transmit power ratio/coefficient information may be specified, for example, as shown in Table 4.

TABLE 4

| Bits | $\beta$ |
| --- | --- |
| 000 | 0.1:0.9 |
| 001 | 0.15:0.85 |
| 010 | 0.2:0.8 |
| 011 | 0.25:0.75 |
| 100 | 0.3:0.7 |
| 101 | 0.35:0.65 |
| 110 | 0.4:0.6 |
| 111 | 0.45:0.55 |

In another possible implementation, the field indicates information about a terminal type corresponding to a transmission mode and an index of downlink data transmit power ratio/coefficient information.

Optionally, when the base station uses a spatial multiplexing transmission manner whose rank is 2 or a spatial multiplexing transmission mode including a dual codeword, a second field may be used to indicate an index of downlink data transmit power ratio/coefficient information of each codeword. Further, for the paired transmission mode, in addition to indicating downlink data transmit power ratio/coefficient information, the second field may implicitly indicate information about a terminal type corresponding to the transmission mode, that is, the terminal is in the paired transmission mode. For the non-paired transmission mode, the second field may also indicate the information about the terminal type corresponding to the transmission mode. For example, the indication field includes 4 bits, and indicated meanings of states of the field may be shown in Table 5. For brevity, "using the non-paired transmission mode" is briefly referred to as "non-paired" in the following embodiments.

TABLE 5

| Value corresponding to a bit | Indicated meaning |
| --- | --- |
| 0 | Non-paired transmission (in this case, this indicates that all dual codewords are non-paired) |
| 1 | Codeword 0: $0^{th}$ power allocation value<br>Codeword 1: non-paired |
| 2 | Codeword 0: $1^{st}$ power allocation value<br>Codeword 1: non-paired |
| 3 | Codeword 0: $2^{nd}$ power allocation value<br>Codeword 1: non-paired |
| 4 | Codeword 0: non-paired<br>Codeword 1: $0^{th}$ power allocation value |
| 5 | Codeword 0: $0^{th}$ power allocation value<br>Codeword 1: $0^{th}$ power allocation value |
| 6 | Codeword 0: $1^{st}$ power allocation value<br>Codeword 1: $0^{th}$ power allocation value |
| 7 | Codeword 0: $2^{nd}$ power allocation value<br>Codeword 1: $0^{th}$ power allocation value |
| 8 | Codeword 0: non-paired<br>Codeword 1: $1^{st}$ power allocation value |
| 9 | Codeword 0: $0^{th}$ power allocation value<br>Codeword 1: $1^{st}$ power allocation value |
| 10 | Codeword 0: $1^{st}$ power allocation value<br>Codeword 1: $1^{st}$ power allocation value |
| 11 | Codeword 0: $2^{nd}$ power allocation value<br>Codeword 1: $1^{st}$ power allocation value |
| 12 | Codeword 0: non-paired<br>Codeword 1: $2^{nd}$ power allocation value |
| 13 | Codeword 0: $0^{th}$ power allocation value<br>Codeword 1: $2^{nd}$ power allocation value |
| 14 | Codeword 0: $1^{st}$ power allocation value<br>Codeword 1: $2^{nd}$ power allocation value |

TABLE 5-continued

| Value corresponding to a bit | Indicated meaning |
|---|---|
| 15 | Codeword 0: $2^{nd}$ power allocation value<br>Codeword 1: $2^{nd}$ power allocation value |

Alternatively, when the base station uses a spatial multiplexing transmission manner whose rank is 2 or a spatial multiplexing transmission mode including a dual codeword, a field indicating an index of downlink data transmit power ratio/coefficient information may be shown in Table 6.

TABLE 6

| Value corresponding to a bit | Indicated meaning |
|---|---|
| 0 | Non-paired transmission (in this case, this indicates that all dual codewords are non-paired) |
| 1 | Codeword 0: $0^{th}$ power allocation value<br>Codeword 1: $0^{th}$ power allocation value |
| 2 | Codeword 0: $1^{st}$ power allocation value<br>Codeword 1: $0^{th}$ power allocation value |
| 3 | Codeword 0: $2^{nd}$ power allocation value<br>Codeword 1: $0^{th}$ power allocation value |
| 4 | Codeword 0: $0^{th}$ power allocation value<br>Codeword 1: $1^{st}$ power allocation value |
| 5 | Codeword 0: $1^{st}$ power allocation value<br>Codeword 1: $1^{st}$ power allocation value |
| 6 | Codeword 0: $2^{nd}$ power allocation value<br>Codeword 1: $1^{st}$ power allocation value |
| 7 | Codeword 0: $0^{th}$ power allocation value<br>Codeword 1: $2^{nd}$ power allocation value |
| 8 | Codeword 0: $1^{st}$ power allocation value<br>Codeword 1: $2^{nd}$ power allocation value |
| 9 | Codeword 0: $2^{nd}$ power allocation value<br>Codeword 1: $2^{nd}$ power allocation value |
| 10 | Reserved |
| 11 | Reserved |
| 12 | Reserved |
| 13 | Reserved |
| 14 | Reserved |
| 15 | Reserved |

It may be understood that, Table 5 and Table 6 are merely examples for describing a field indicating an index of downlink data transmit power ratio/coefficient information when the base station uses the spatial multiplexing transmission manner whose rank is 2 or the spatial multiplexing transmission mode including a dual codeword. A quantity of bits and a specific indicated meaning of the field indicating the index of the downlink data transmit power ratio/coefficient information are not limited in this embodiment of the present invention.

Optionally, when the base station uses a spatial multiplexing transmission mode whose rank is 1 or a spatial multiplexing transmission mode including a single codeword, or uses a multi-antenna transmit diversity transmission mode, a field indicating an index of the downlink data transmit power ratio/coefficient information may include 4 bits, as shown in Table 7.

TABLE 7

| Value corresponding to a bit | Indicated meaning |
|---|---|
| 0 | Non-paired transmission |
| 1 | $0^{th}$ power allocation value |
| 2 | $1^{st}$ power allocation value |
| 3 | $2^{nd}$ power allocation value |
| 4 | Reserved |
| 5 | Reserved |
| 6 | Reserved |
| 7 | Reserved |
| 8 | Reserved |
| 9 | Reserved |
| 10 | Reserved |
| 11 | Reserved |
| 12 | Reserved |
| 13 | Reserved |
| 14 | Reserved |
| 15 | Reserved |

Alternatively, the field indicating the index of the downlink data transmit power ratio/coefficient information may be shown in Table 8. When the base station transmits only a single codeword, the field is understood according to a first column and a second column of Table 8. When the base station transmits a dual codeword, the field is understood according to a third column and a fourth column of Table 8.

TABLE 8

| Single codeword | | Dual codeword | |
|---|---|---|---|
| Value corresponding to a bit | Indicated meaning | Value corresponding to a bit | Indicated meaning |
| 0 | Non-paired transmission | 0 | Non-paired transmission |
| 1 | $0^{th}$ power allocation value | 1 | Codeword 0: $0^{th}$ power allocation value<br>Codeword 1: non-paired |
| 2 | $1^{st}$ power allocation value | 2 | Codeword 0: $1^{st}$ power allocation value<br>Codeword 1: non-paired |
| 3 | $2^{nd}$ power allocation value | 3 | Codeword 0: $2^{nd}$ power allocation value<br>Codeword 1: non-paired |
| 4 | Reserved | 4 | Codeword 0: non-paired<br>Codeword 1: $0^{th}$ power allocation value |
| 5 | Reserved | 5 | Codeword 0: $0^{th}$ power allocation value<br>Codeword 1: $0^{th}$ power allocation value |
| 6 | Reserved | 6 | Codeword 0: $1^{st}$ power allocation value<br>Codeword 1: $0^{th}$ power allocation value |
| 7 | Reserved | 7 | Codeword 0: $2^{nd}$ power allocation value<br>Codeword 1: $0^{th}$ power allocation value |
| 8 | Reserved | 8 | Codeword 0: non-paired<br>Codeword 1: $1^{st}$ power allocation value |
| 9 | Reserved | 9 | Codeword 0: $0^{th}$ power allocation value<br>Codeword 1: $1^{st}$ power allocation value |
| 10 | Reserved | 10 | Codeword 0: $1^{st}$ power allocation value<br>Codeword 1: $1^{st}$ power allocation value |
| 11 | Reserved | 11 | Codeword 0: $2^{nd}$ power allocation value<br>Codeword 1: $1^{st}$ power allocation value |
| 12 | Reserved | 12 | Codeword 0: non-paired<br>Codeword 1: $2^{nd}$ power allocation value |
| 13 | Reserved | 13 | Codeword 0: $0^{th}$ power allocation value<br>Codeword 1: $2^{nd}$ power allocation value |

TABLE 8-continued

| Single codeword | | Dual codeword | |
|---|---|---|---|
| Value corresponding to a bit | Indicated meaning | Value corresponding to a bit | Indicated meaning |
| 14 | Reserved | 14 | Codeword 0: $1^{st}$ power allocation value<br>Codeword 1: $2^{nd}$ power allocation value |
| 15 | Reserved | 15 | Codeword 0: $2^{nd}$ power allocation value<br>Codeword 1: $2^{nd}$ power allocation value |

Alternatively, the field indicating the index of the downlink data transmit power ratio/coefficient information may be shown in Table 9. When the base station transmits only a single codeword, the field is understood according to a first column and a second column of Table 9. When the base station transmits a dual codeword, the field is understood according to a third column and a fourth column of Table 9.

TABLE 9

| Single codeword | | Dual codeword | |
|---|---|---|---|
| Value corresponding to a bit | Indicated meaning | Value corresponding to a bit | Indicated meaning |
| 0 | Non-paired transmission | 0 | Non-paired transmission |
| 1 | $0^{th}$ power allocation value | 1 | Codeword 0: $0^{th}$ power allocation value<br>Codeword 1: $0^{th}$ power allocation value |
| 2 | $1^{st}$ power allocation value | 2 | Codeword 0: $1^{st}$ power allocation value<br>Codeword 1: $0^{th}$ power allocation value |
| 3 | $2^{nd}$ power allocation value | 3 | Codeword 0: $2^{nd}$ power allocation value<br>Codeword 1: $0^{th}$ power allocation value |

TABLE 9-continued

| Single codeword | | Dual codeword | |
|---|---|---|---|
| Value corresponding to a bit | Indicated meaning | Value corresponding to a bit | Indicated meaning |
| 4 | Reserved | 4 | Codeword 0: $0^{th}$ power allocation value<br>Codeword 1: $1^{st}$ power allocation value |
| 5 | Reserved | 5 | Codeword 0: $1^{st}$ power allocation value<br>Codeword 1: $1^{st}$ power allocation value |
| 6 | Reserved | 6 | Codeword 0: $2^{nd}$ power allocation value<br>Codeword 1: $1^{st}$ power allocation value |
| 7 | Reserved | 7 | Codeword 0: $0^{th}$ power allocation value<br>Codeword 1: $2^{nd}$ power allocation value |
| 8 | Reserved | 8 | Codeword 0: $1^{st}$ power allocation value<br>Codeword 1: $2^{nd}$ power allocation value |
| 9 | Reserved | 9 | Codeword 0: $2^{nd}$ power allocation value<br>Codeword 1: $2^{nd}$ power allocation value |
| 10 | Reserved | 10 | Reserved |
| 11 | Reserved | 11 | Reserved |
| 12 | Reserved | 12 | Reserved |
| 13 | Reserved | 13 | Reserved |
| 14 | Reserved | 14 | Reserved |
| 15 | Reserved | 15 | Reserved |

In another possible implementation, a same field is used to jointly indicate information about a terminal type corresponding to a transmission mode, an index of downlink data transmit power ratio/coefficient information, and precoding information. Optionally, the field may include 6 bits, and indicated meanings of states of the field may be shown in Table 10, or may be shown in Table 11.

TABLE 10

| Single codeword | | Dual codeword | |
|---|---|---|---|
| Value corresponding to a bit | Indicated meaning | Value corresponding to a bit | Indicated meaning |
| 0 | Two layers: transmit diversity<br>Non-paired transmission | 0 | Two layers: precoding is performed according to a precoding matrix $$\frac{1}{2}\begin{bmatrix} 1 & 1 \\ 1 & -1 \end{bmatrix}$$<br>non-paired transmission |
| 1 | One layer: precoding is performed according to a precoding vector $[1\ 1]^T/\sqrt{2}$<br>Non-paired transmission | 1 | Two layers: precoding is performed according to a precoding matrix $$\frac{1}{2}\begin{bmatrix} 1 & 1 \\ j & -j \end{bmatrix}$$<br>Non-paired transmission |

TABLE 10-continued

| Single codeword | | Dual codeword | |
|---|---|---|---|
| Value corresponding to a bit | Indicated meaning | Value corresponding to a bit | Indicated meaning |
| 2 | One layer: precoding is performed according to a precoding vector $[1\ -1]^T/\sqrt{2}$ Non-paired transmission | 2 | Two layers: precoding is performed according to a latest PMI reported by a PUSCH Non-paired transmission |
| 3 | One layer: precoding is performed according to a precoding vector $[1\ j]^T/\sqrt{2}$ Non-paired transmission | 3 | Two layers: precoding is performed according to a precoding matrix $\frac{1}{2}\begin{bmatrix}1 & 1\\ 1 & -1\end{bmatrix}$ Codeword 0: $0^{th}$ power allocation value Codeword 1: non-paired |
| 4 | One layer: precoding is performed according to a precoding vector $[1\ -j]^T/\sqrt{2}$ Non-paired transmission | 4 | Two layers: precoding is performed according to a precoding matrix $\frac{1}{2}\begin{bmatrix}1 & 1\\ j & -j\end{bmatrix}$ Codeword 0: $0^{th}$ power allocation value Codeword 1: non-paired |
| 5 | One layer: precoding is performed according to a latest PMI reported by a PUSCH, and if a reported rank is 2, a result obtained by multiplying first columns of all reported PMIs by $\sqrt{2}$ is used as a precoding vector for precoding Non-paired transmission | 5 | Two layers: precoding is performed according to a latest PMI reported by a PUSCH Codeword 0: $0^{th}$ power allocation value Codeword 1: non-paired |
| 6 | One layer: precoding is performed according to a latest PMI reported by a PUSCH, and if a reported rank is 2, a result obtained by multiplying second columns of all reported PMIs by $\sqrt{2}$ is used as a precoding vector for precoding Non-paired transmission | 6 | Two layers: precoding is performed according to a precoding matrix $\frac{1}{2}\begin{bmatrix}1 & 1\\ 1 & -1\end{bmatrix}$ Codeword 0: 1st power allocation value Codeword 1: non-paired |
| 7 | Two layers: transmit diversity; $0^{th}$ power allocation value | 7 | Two layers: precoding is performed according to a precoding matrix $\frac{1}{2}\begin{bmatrix}1 & 1\\ j & -j\end{bmatrix}$ Codeword 0: $1^{st}$ power allocation value Codeword 1: non-paired |
| 8 | One layer: precoding is performed according to a precoding vector $[1\ 1]^T/\sqrt{2}$ $0^{th}$ power allocation value | 8 | Two layers: precoding is performed according to a latest PMI reported by a PUSCH Codeword 0: $1^{st}$ power allocation value Codeword 1: non-paired |

TABLE 10-continued

| Single codeword | | Dual codeword | |
|---|---|---|---|
| Value corresponding to a bit | Indicated meaning | Value corresponding to a bit | Indicated meaning |
| 9 | One layer: precoding is performed according to a precoding vector $[1\ -1]^T/\sqrt{2}$ $0^{th}$ power allocation value | 9 | Two layers: precoding is performed according to a precoding matrix $\frac{1}{2}\begin{bmatrix}1 & 1\\ 1 & -1\end{bmatrix}$ Codeword 0: $2^{nd}$ power allocation value Codeword 1: non-paired |
| 10 | One layer: precoding is performed according to a precoding vector $[1\ j]^T/\sqrt{2}$ $0^{th}$ power allocation value | 10 | Two layers: precoding is performed according to a precoding matrix $\frac{1}{2}\begin{bmatrix}1 & 1\\ j & -j\end{bmatrix}$ Codeword 0: $2^{nd}$ power allocation value Codeword 1: non-paired |
| 11 | One layer: precoding is performed according to a precoding vector $[1\ -j]^T/\sqrt{2}$ $0^{th}$ power allocation value | 11 | Two layers: precoding is performed according to a latest PMI reported by a PUSCH Codeword 0: $2^{nd}$ power allocation value Codeword 1: non-paired |
| 12 | One layer: precoding is performed according to a latest PMI reported by a PUSCH, and if a reported rank is 2, a result obtained by multiplying first columns of all reported PMIs by $\sqrt{2}$ is used as a precoding vector for precoding $0^{th}$ power allocation value | 12 | Two layers: precoding is performed according to a precoding matrix $\frac{1}{2}\begin{bmatrix}1 & 1\\ 1 & -1\end{bmatrix}$ Codeword 0: non-paired Codeword 1: $0^{th}$ power allocation value |
| 13 | One layer: precoding is performed according to a latest PMI reported by a PUSCH, and if a reported rank is 2, a result obtained by multiplying second columns of all reported PMIs by $\sqrt{2}$ is used as a precoding vector for precoding $0^{th}$ power allocation value | 13 | Two layers: precoding is performed according to a precoding matrix $\frac{1}{2}\begin{bmatrix}1 & 1\\ j & -j\end{bmatrix}$ Codeword 0: non-paired Codeword 1: $0^{th}$ power allocation value |
| 14 | Two layers: transmit diversity $1^{st}$ power allocation value | 14 | Two layers: precoding is performed according to a latest PMI reported by a PUSCH Codeword 0: non-paired Codeword 1: $0^{th}$ power allocation value |
| 15 | One layer: precoding is performed according to a precoding vector $[1\ 1]^T/\sqrt{2}$ $1^{st}$ power allocation value | 15 | Two layers: precoding is performed according to a precoding matrix $\frac{1}{2}\begin{bmatrix}1 & 1\\ 1 & -1\end{bmatrix}$ |

TABLE 10-continued

| Single codeword | | Dual codeword | |
|---|---|---|---|
| Value corresponding to a bit | Indicated meaning | Value corresponding to a bit | Indicated meaning |
| 16 | One layer: precoding is performed according to a precoding vector $[1\ -1]^T/\sqrt{2}$ $1^{st}$ power allocation value | 16 | Codeword 0: $0^{th}$ power allocation value Codeword 1: $0^{th}$ power allocation value Two layers: precoding is performed according to a precoding matrix $\frac{1}{2}\begin{bmatrix} 1 & 1 \\ j & -j \end{bmatrix}$ |
| 17 | One layer: precoding is performed according to a precoding vector $[1\ j]^T/\sqrt{2}$ $1^{st}$ power allocation value | 17 | Codeword 0: $0^{th}$ power allocation value Codeword 1: $0^{th}$ power allocation value Two layers: precoding is performed according to a latest PMI reported by a PUSCH Codeword 0: $0^{th}$ power allocation value Codeword 1: $0^{th}$ power allocation value |
| 18 | On layer: precoding is performed according to a precoding vector $[1\ -j]^T/\sqrt{2}$ $1^{st}$ power allocation value | 18 | Two layers: precoding is performed according to a precoding matrix $\frac{1}{2}\begin{bmatrix} 1 & 1 \\ 1 & -1 \end{bmatrix}$ |
| 19 | One layer: precoding is performed according to a latest PMI reported by a PUSCH, and if a reported rank is 2, a result obtained by multiplying first columns of all reported PMIs by $\sqrt{2}$ is used as a precoding vector for precoding $1^{st}$ power allocation value | 19 | Codeword 0: $1^{st}$ power allocation value Codeword 1: $0^{th}$ power allocation value Two layers: precoding is performed according to a precoding matrix $\frac{1}{2}\begin{bmatrix} 1 & 1 \\ j & -j \end{bmatrix}$ Codeword 0: $1^{st}$ power allocation value Codeword 1: $0^{th}$ power allocation value |
| 20 | One layer: precoding is performed according to a latest PMI reported by a PUSCH, and if a reported rank is 2, a result obtained by multiplying second columns of all reported PMIs by $\sqrt{2}$ is used as a precoding vector for precoding $1^{st}$ power allocation value | 20 | Two layers: precoding is performed according to a latest PMI reported by a PUSCH Codeword 0: $1^{st}$ power allocation value Codeword 1: $0^{th}$ power allocation value |
| 21 | Two layers: transmit diversity $2^{nd}$ power allocation value | 21 | Two layers: precoding is performed according to a precoding matrix $\frac{1}{2}\begin{bmatrix} 1 & 1 \\ 1 & -1 \end{bmatrix}$ |

TABLE 10-continued

| Single codeword | | Dual codeword | |
|---|---|---|---|
| Value corresponding to a bit | Indicated meaning | Value corresponding to a bit | Indicated meaning |
| 22 | One layer: precoding is performed according to a precoding vector $[1\ 1]^T/\sqrt{2}$ $2^{nd}$ power allocation value | 22 | Codeword 0: $2^{nd}$ power allocation value Codeword 1: $0^{th}$ power allocation value Two layers: precoding is performed according to a precoding matrix $\frac{1}{2}\begin{bmatrix}1 & 1\\ j & -j\end{bmatrix}$ |
| 23 | One layer: precoding is performed according to a precoding vector $[1\ -1]^T/\sqrt{2}$ $2^{nd}$ power allocation value | 23 | Codeword 0: $2^{nd}$ power allocation value Codeword 1: $0^{th}$ power allocation value Two layers: precoding is performed according to a latest PMI reported by a PUSCH Codeword 0: $2^{nd}$ power allocation value Codeword 1: $0^{th}$ power allocation value |
| 24 | One layer: precoding is performed according to a precoding vector $[1\ j]^T/\sqrt{2}$ $2^{nd}$ power allocation value | 24 | Two layers: precoding is performed according to a precoding matrix $\frac{1}{2}\begin{bmatrix}1 & 1\\ 1 & -1\end{bmatrix}$ |
| 25 | One layer: precoding is performed according to a precoding vector $[1\ -j]^T/\sqrt{2}$ $2^{nd}$ power allocation value | 25 | Codeword 0: non-paired Codeword 1: $1^{st}$ power allocation value Two layers: precoding is performed according to a precoding matrix $\frac{1}{2}\begin{bmatrix}1 & 1\\ j & -j\end{bmatrix}$ |
| 26 | One layer: precoding is performed according to a latest PMI reported by a PUSCH, and if a reported rank is 2, a result obtained by multiplying first columns of all reported PMIs by $\sqrt{2}$ is used as a precoding vector for precoding $2^{nd}$ power allocation value | 26 | Codeword 0: non-paired Codeword 1: $1^{st}$ power allocation value Two layers: precoding is performed according to a latest PMI reported by a PUSCH Codeword 0: non-paired Codeword 1: $1^{st}$ power allocation value |
| 27 | One layer: precoding is performed according to a latest PMI reported by a PUSCH, and if a reported rank is 2, a result obtained by multiplying second columns of all reported PMIs by $\sqrt{2}$ is used as a precoding vector for precoding $2^{nd}$ power allocation value | 27 | Two layers: precoding is performed according to a precoding matrix $\frac{1}{2}\begin{bmatrix}1 & 1\\ 1 & -1\end{bmatrix}$ Codeword 0: $0^{th}$ power allocation value Codeword 1: $1^{st}$ power allocation value |

TABLE 10-continued

| Single codeword | | Dual codeword | |
|---|---|---|---|
| Value corresponding to a bit | Indicated meaning | Value corresponding to a bit | Indicated meaning |
| 28 to 63 | Reserved | 28 | Two layers: precoding is performed according to a precoding matrix $$\frac{1}{2}\begin{bmatrix} 1 & 1 \\ j & -j \end{bmatrix}$$ Codeword 0: $0^{th}$ power allocation value Codeword 1: $1^{st}$ power allocation value |
| | | 29 | Two layers: precoding is performed according to a latest PMI reported by a PUSCH Codeword 0: $0^{th}$ power allocation value Codeword 1: $1^{st}$ power allocation value |
| | | 30 | Two layers: precoding is performed according to a precoding matrix $$\frac{1}{2}\begin{bmatrix} 1 & 1 \\ 1 & -1 \end{bmatrix}$$ Codeword 0: $1^{st}$ power allocation value Codeword 1: $1^{st}$ power allocation value |
| | | 31 | Two layers: precoding is performed according to a precoding matrix $$\frac{1}{2}\begin{bmatrix} 1 & 1 \\ j & -j \end{bmatrix}$$ Codeword 0: $1^{st}$ power allocation value Codeword 1: $1^{st}$ power allocation value |
| | | 32 | Two layers: precoding is performed according to a latest PMI reported by a PUSCH Codeword 0: $1^{st}$ power allocation value Codeword 1: $1^{st}$ power allocation value |
| | | 33 | Two layers: precoding is performed according to a precoding matrix $$\frac{1}{2}\begin{bmatrix} 1 & 1 \\ 1 & -1 \end{bmatrix}$$ Codeword 0: $2^{nd}$ power allocation value Codeword 1: $1^{st}$ power allocation value |
| | | 34 | Two layers: precoding is performed according to a precoding matrix $$\frac{1}{2}\begin{bmatrix} 1 & 1 \\ j & -j \end{bmatrix}$$ Codeword 0: $2^{nd}$ power allocation value |

TABLE 10-continued

| Single codeword | | Dual codeword | |
|---|---|---|---|
| Value corresponding to a bit | Indicated meaning | Value corresponding to a bit | Indicated meaning |
| | | 35 | Codeword 1: $1^{st}$ power allocation value<br>Two layers: precoding is performed according to a latest PMI reported by a PUSCH |
| | | 36 | Codeword 0: $2^{nd}$ power allocation value<br>Codeword 1: $1^{st}$ power allocation value<br>Two layers: precoding is performed according to a precoding matrix $$\frac{1}{2}\begin{bmatrix} 1 & 1 \\ 1 & -1 \end{bmatrix}$$ |
| | | 37 | Codeword 0: non-paired<br>Codeword 1: $2^{nd}$ power allocation value<br>Two layers: precoding is performed according to a precoding matrix $$\frac{1}{2}\begin{bmatrix} 1 & 1 \\ j & -j \end{bmatrix}$$ |
| | | 38 | Codeword 0: non-paired<br>Codeword 1: $2^{nd}$ power allocation value<br>Two layers: precoding is performed according to a latest PMI reported by a PUSCH |
| | | 39 | Codeword 0: non-paired<br>Codeword 1: $2^{nd}$ power allocation value<br>Two layers: precoding is performed according to a precoding matrix $$\frac{1}{2}\begin{bmatrix} 1 & 1 \\ 1 & -1 \end{bmatrix}$$ |
| | | 40 | Codeword 0: $0^{th}$ power allocation value<br>Codeword 1: $2^{nd}$ power allocation value<br>Two layers: precoding is performed according to a precoding matrix $$\frac{1}{2}\begin{bmatrix} 1 & 1 \\ j & -j \end{bmatrix}$$ |
| | | 41 | Codeword 0: $0^{th}$ power allocation value<br>Codeword 1: $2^{nd}$ power allocation value<br>Two layers: precoding is performed according to a latest PMI reported by a PUSCH |
| | | 42 | Codeword 0: $0^{th}$ power allocation value<br>Codeword 1: $2^{nd}$ power allocation value<br>Two layers: precoding is performed according to a precoding matrix |

TABLE 10-continued

| Single codeword | | Dual codeword | |
|---|---|---|---|
| Value corresponding to a bit | Indicated meaning | Value corresponding to a bit | Indicated meaning |
| | | 43 | $\frac{1}{2}\begin{bmatrix} 1 & 1 \\ 1 & -1 \end{bmatrix}$<br><br>Codeword 0: $1^{st}$ power allocation value<br>Codeword 1: $2^{nd}$ power allocation value<br>Two layers: precoding is performed according to a precoding matrix<br><br>$\frac{1}{2}\begin{bmatrix} 1 & 1 \\ j & -j \end{bmatrix}$ |
| | | 44 | Codeword 0: $1^{st}$ power allocation value<br>Codeword 1: $2^{nd}$ power allocation value<br>Two layers: precoding is performed according to a latest PMI reported by a PUSCH |
| | | 45 | Codeword 0: $1^{st}$ power allocation value<br>Codeword 1: $2^{nd}$ power allocation value<br>Two layers: precoding is performed according to a precoding matrix<br><br>$\frac{1}{2}\begin{bmatrix} 1 & 1 \\ 1 & -1 \end{bmatrix}$ |
| | | 46 | Codeword 0: $2^{nd}$ power allocation value<br>Codeword 1: $2^{nd}$ power allocation value<br>Two layers: precoding is performed according to a precoding matrix<br><br>$\frac{1}{2}\begin{bmatrix} 1 & 1 \\ j & -j \end{bmatrix}$ |
| | | 47 | Codeword 0: $2^{nd}$ power allocation value<br>Codeword 1: $2^{nd}$ power allocation value<br>Two layers: precoding is performed according to a latest PMI reported by a PUSCH<br>Codeword 0: $2^{nd}$ power allocation value<br>Codeword 1: $2^{nd}$ power allocation value |
| | | 48 to 63 | Reserved |

TABLE 11

| Single codeword | | Dual codeword | |
|---|---|---|---|
| Value corresponding to a bit | Indicated meaning | Value corresponding to a bit | Indicated meaning |
| 0 | Two layers: transmit diversity<br>Non-paired transmission | 0 | Two layers: precoding is performed according to a precoding matrix $\frac{1}{2}\begin{bmatrix}1 & 1\\1 & -1\end{bmatrix}$<br>Non-paired transmission |
| 1 | One layer: precoding is performed according to a precoding vector $[1\ \ 1]^T/\sqrt{2}$<br>Non-paired transmission | 1 | Two layers: precoding is performed according to a precoding matrix $\frac{1}{2}\begin{bmatrix}1 & 1\\j & -j\end{bmatrix}$<br>Non-paired transmission |
| 2 | One layer: precoding is performed according to a precoding vector $[1\ \ 1]^T/\sqrt{2}$<br>Non-paired transmission | 2 | Two layers: precoding is performed according to a latest PMI reported by a PUSCH<br>Non-paired transmission |
| 3 | One layer: precoding is performed according to a precoding vector $[1\ \ j]^T/\sqrt{2}$<br>Non-paired transmission | 3 | Two layers: precoding is performed according to a precoding matrix $\frac{1}{2}\begin{bmatrix}1 & 1\\1 & -1\end{bmatrix}$<br>Codeword 0: $0^{th}$ power allocation value<br>Codeword 1: non-paired |
| 4 | One layer: precoding is performed according to a precoding vector $[1\ \ j]^T/\sqrt{2}$<br>Non-paired transmission | 4 | Two layers: precoding is performed according to a precoding matrix $\frac{1}{2}\begin{bmatrix}1 & 1\\j & -j\end{bmatrix}$<br>Codeword 0: $0^{th}$ power allocation value<br>Codeword 1: non-paired |
| 5 | One layer: precoding is performed according to a latest PMI reported by a PUSCH, and if a reported rank is 2, a result obtained by multiplying first columns of all reported PMIs by $\sqrt{2}$ is used as a precoding vector for precoding<br>Non-paired transmission | 5 | Two layers: precoding is performed according to a latest PMI reported by a PUSCH<br>Codeword 0: $0^{th}$ power allocation value<br>Codeword 1: non-paired |
| 6 | One layer: precoding is performed according to a latest PMI reported by a PUSCH, and if a reported rank is 2, a result obtained by multiplying second columns of all reported PMIs by $\sqrt{2}$ is used as a precoding vector for precoding<br>Non-paired transmission | 6 | Two layers: precoding is performed according to a precoding matrix $\frac{1}{2}\begin{bmatrix}1 & 1\\1 & -1\end{bmatrix}$<br>Codeword 0: $1^{st}$ power allocation value<br>Codeword 1: non-paired |
| 7 | One layer: precoding is performed according to a precoding vector $[1\ \ 1]^T/\sqrt{2}$<br>$0^{th}$ power allocation value | 7 | Two layers: precoding is performed according to a precoding matrix $\frac{1}{2}\begin{bmatrix}1 & 1\\j & -j\end{bmatrix}$<br>Codeword 0: $1^{st}$ power allocation value<br>Codeword 1: non-paired |
| 8 | One layer: precoding is performed according to a precoding vector $[1\ \ -1]^T/\sqrt{2}$<br>$0^{th}$ power allocation value | 8 | Two layers: precoding is performed according to a latest PMI reported by a PUSCH<br>Codeword 0: $1^{st}$ power allocation value<br>Codeword 1: non-paired |
| 9 | One layer: precoding is performed according to a precoding vector $[1\ \ j]^T/\sqrt{2}$<br>$0^{th}$ power allocation value | 9 | Two layers: precoding is performed according to a precoding matrix $\frac{1}{2}\begin{bmatrix}1 & 1\\1 & -1\end{bmatrix}$<br>Codeword 0: $2^{nd}$ power allocation value<br>Codeword 1: non-paired |
| 10 | One layer: precoding is performed according to a precoding vector $[1\ \ -j]^T/\sqrt{2}$<br>$0^{th}$ power allocation value | 10 | Two layers: precoding is performed according to a precoding matrix $\frac{1}{2}\begin{bmatrix}1 & 1\\j & -j\end{bmatrix}$<br>Codeword 0: $2^{nd}$ power allocation value<br>Codeword 1: non-paired |
| 11 | One layer: precoding is performed according to a latest PMI reported by a PUSCH, and if a reported rank is 2, a result obtained by multiplying first columns of all reported PMIs by $\sqrt{2}$ is used as a precoding vector for precoding<br>$0^{th}$ power allocation value | 11 | Two layers: precoding is performed according to a latest PMI reported by a PUSCH<br>Codeword 0: $2^{nd}$ power allocation value<br>Codeword 1: non-paired |

TABLE 11-continued

| Single codeword | | Dual codeword | |
|---|---|---|---|
| Value corresponding to a bit | Indicated meaning | Value corresponding to a bit | Indicated meaning |
| 12 | One layer: precoding is performed according to a latest PMI reported by a PUSCH, and if a reported rank is 2, a result obtained by multiplying second columns of all reported PMIs by $\sqrt{2}$ is used as a precoding vector for precoding $0^{th}$ power allocation value | 12 | Two layers: precoding is performed according to a precoding matrix $\frac{1}{2}\begin{bmatrix} 1 & 1 \\ 1 & -1 \end{bmatrix}$ Codeword 0: non-paired Codeword 1: $0^{th}$ power allocation value |
| 13 | One layer: precoding is performed according to a precoding vector $[1\ \ 1]^T/\sqrt{2}$ $1^{st}$ power allocation value | 13 | Two layers: precoding is performed according to a precoding matrix $\frac{1}{2}\begin{bmatrix} 1 & 1 \\ j & -j \end{bmatrix}$ Codeword 0: non-paired Codeword 1: $0^{th}$ power allocation value |
| 14 | One layer: precoding is performed according to a precoding vector $[1\ \ -1]^T/\sqrt{2}$ $1^{st}$ power allocation value | 14 | Two layers: precoding is performed according to a latest PMI reported by a PUSCH Codeword 0: non-paired Codeword 1: $0^{th}$ power allocation value |
| 15 | One layer: precoding is performed according to a precoding vector $[1\ \ j]^T/\sqrt{2}$ $1^{st}$ power allocation value | 15 | Two layers: precoding is performed according to a precoding matrix $\frac{1}{2}\begin{bmatrix} 1 & 1 \\ 1 & -1 \end{bmatrix}$ Codeword 0: $0^{th}$ power allocation value Codeword 1: $0^{th}$ power allocation value |
| 16 | One layer: precoding is performed according to a precoding vector $[1\ \ -j]^T/\sqrt{2}$ $1^{st}$ power allocation value | 16 | Two layers: precoding is performed according to a precoding matrix $\frac{1}{2}\begin{bmatrix} 1 & 1 \\ j & -j \end{bmatrix}$ Codeword 0: $0^{th}$ power allocation value Codeword 1: $0^{th}$ power allocation value |
| 17 | One layer: precoding is performed according to a latest PMI reported by a PUSCH, and if a reported rank is 2, a result obtained by multiplying first columns of all reported PMIs by $\sqrt{2}$ is used as a precoding vector for precoding $1^{st}$ power allocation value | 17 | Two layers: precoding is performed according to a latest PMI reported by a PUSCH Codeword 0: $0^{th}$ power allocation value Codeword 1: $0^{th}$ power allocation value |
| 18 | One layer: precoding is performed according to a latest PMI reported by a PUSCH, and if a reported rank is 2, a result obtained by multiplying second columns of all reported PMIs by $\sqrt{2}$ is used as a precoding vector for precoding $1^{st}$ power allocation value | 18 | Two layers: precoding is performed according to a precoding matrix $\frac{1}{2}\begin{bmatrix} 1 & 1 \\ 1 & -1 \end{bmatrix}$ Codeword 0: $1^{st}$ power allocation value Codeword 1: $0^{th}$ power allocation value |
| 19 | One layer: precoding is performed according to a precoding vector $[1\ \ 1]^T/\sqrt{2}$ $2^{nd}$ power allocation value | 19 | Two layers: precoding is performed according to a precoding matrix $\frac{1}{2}\begin{bmatrix} 1 & 1 \\ j & -j \end{bmatrix}$ Codeword 0: $1^{st}$ power allocation value Codeword 1: $0^{th}$ power allocation value |
| 20 | One layer: precoding is performed according to a precoding vector $[1\ \ -1]^T/\sqrt{2}$ $2^{nd}$ power allocation value | 20 | Two layers: precoding is performed according to a latest PMI reported by a PUSCH Codeword 0: $1^{st}$ power allocation value Codeword 1: $0^{th}$ power allocation value |
| 21 | One layer: precoding is performed according to a precoding vector $[1\ \ j]^T/\sqrt{2}$ $2^{nd}$ power allocation value | 21 | Two layers: precoding is performed according to a precoding matrix $\frac{1}{2}\begin{bmatrix} 1 & 1 \\ 1 & -1 \end{bmatrix}$ Codeword 0: $2^{nd}$ power allocation value Codeword 1: $0^{th}$ power allocation value |
| 22 | One layer: precoding is performed according to a precoding vector $[1\ \ -j]^T/\sqrt{2}$ $2^{nd}$ power allocation value | 22 | Two layers: precoding is performed according to a precoding matrix $\frac{1}{2}\begin{bmatrix} 1 & 1 \\ j & -j \end{bmatrix}$ Codeword 0: $2^{nd}$ power allocation value Codeword 1: $0^{th}$ power allocation value |
| 23 | One layer: precoding is performed according to a latest PMI reported by a PUSCH, and if a reported rank is 2, a result obtained by | 23 | Two layers: precoding is performed according to a latest PMI reported by a PUSCH Codeword 0: $2^{nd}$ power allocation value |

TABLE 11-continued

| | Single codeword | | Dual codeword |
|---|---|---|---|
| Value corresponding to a bit | Indicated meaning | Value corresponding to a bit | Indicated meaning |
| | multiplying first columns of all reported PMIs by $\sqrt{2}$ is used as a precoding vector for precoding $2^{nd}$ power allocation value | | Codeword 1: $0^{th}$ power allocation value |
| 24 | One layer: precoding is performed according to a latest PMI reported by a PUSCH, and if a reported rank is 2, a result obtained by multiplying second columns of all reported PMIs by $\sqrt{2}$ is used as a precoding vector for precoding $2^{nd}$ power allocation value | 24 | Two layers: precoding is performed according to a precoding matrix $\frac{1}{2}\begin{bmatrix} 1 & 1 \\ 1 & -1 \end{bmatrix}$ Codeword 0: non-paired Codeword 1: $1^{st}$ power allocation value |
| 25 to 63 | Reserved | 25 | Two layers: precoding is performed according to a precoding matrix $\frac{1}{2}\begin{bmatrix} 1 & 1 \\ j & -j \end{bmatrix}$ Codeword 0: non-paired Codeword 1: $1^{st}$ power allocation value |
| | | 26 | Two layers: precoding is performed according to a latest PMI reported by a PUSCH Codeword 0: non-paired Codeword 1: $1^{st}$ power allocation value |
| | | 27 | Two layers: precoding is performed according to a precoding matrix $\frac{1}{2}\begin{bmatrix} 1 & 1 \\ 1 & -1 \end{bmatrix}$ Codeword 0: $0^{th}$ power allocation value Codeword 1: $1^{st}$ power allocation value |
| | | 28 | Two layers: precoding is performed according to a precoding matrix $\frac{1}{2}\begin{bmatrix} 1 & 1 \\ j & -j \end{bmatrix}$ Codeword 0: $0^{th}$ power allocation value Codeword 1: $1^{st}$ power allocation value |
| | | 29 | Two layers: precoding is performed according to a latest PMI reported by a PUSCH Codeword 0: $0^{th}$ power allocation value Codeword 1: $1^{st}$ power allocation value |
| | | 30 | Two layers: precoding is performed according to a precoding matrix $\frac{1}{2}\begin{bmatrix} 1 & 1 \\ 1 & -1 \end{bmatrix}$ Codeword 0: $1^{st}$ power allocation value Codeword 1: $1^{st}$ power allocation value |
| | | 31 | Two layers: precoding is performed according to a precoding matrix $\frac{1}{2}\begin{bmatrix} 1 & 1 \\ j & -j \end{bmatrix}$ Codeword 0: $1^{st}$ power allocation value Codeword 1: $1^{st}$ power allocation value |
| | | 32 | Two layers: precoding is performed according to a latest PMI reported by a PUSCH Codeword 0: $1^{st}$ power allocation value Codeword 1: $1^{st}$ power allocation value |
| | | 33 | Two layers: precoding is performed according to a precoding matrix $\frac{1}{2}\begin{bmatrix} 1 & 1 \\ 1 & -1 \end{bmatrix}$ Codeword 0: $2^{nd}$ power allocation value Codeword 1: $1^{st}$ power allocation value |
| | | 34 | Two layers: precoding is performed according to a precoding matrix $\frac{1}{2}\begin{bmatrix} 1 & 1 \\ j & -j \end{bmatrix}$ Codeword 0: $2^{nd}$ power allocation value Codeword 1: $1^{st}$ power allocation value |
| | | 35 | Two layers: precoding is performed according to a latest PMI reported by a PUSCH Codeword 0: $2^{nd}$ power |

TABLE 11-continued

| Single codeword | | Dual codeword | |
|---|---|---|---|
| Value corresponding to a bit | Indicated meaning | Value corresponding to a bit | Indicated meaning |
| | | | allocation value<br>Codeword 1: $1^{st}$ power allocation value |
| | | 36 | Two layers: precoding is performed according to a precoding matrix $\frac{1}{2}\begin{bmatrix}1 & 1\\1 & -1\end{bmatrix}$<br>Codeword 0: non-paired<br>Codeword 1: $2^{nd}$ power allocation value |
| | | 37 | Two layers: precoding is performed according to a precoding matrix $\frac{1}{2}\begin{bmatrix}1 & 1\\j & -j\end{bmatrix}$<br>Codeword 0: non-paired<br>Codeword 1: $2^{nd}$ power allocation value |
| | | 38 | Two layers: precoding is performed according to a latest PMI reported by a PUSCH<br>Codeword 0: non-paired<br>Codeword 1: $2^{nd}$ power allocation value |
| | | 39 | Two layers: precoding is performed according to a precoding matrix $\frac{1}{2}\begin{bmatrix}1 & 1\\1 & -1\end{bmatrix}$<br>Codeword 0: $0^{th}$ power allocation value<br>Codeword 1: $2^{nd}$ power allocation value |
| | | 40 | Two layers: precoding is performed according to a precoding matrix $\frac{1}{2}\begin{bmatrix}1 & 1\\j & -j\end{bmatrix}$<br>Codeword 0: $0^{th}$ power allocation value<br>Codeword 1: $2^{nd}$ power allocation value |
| | | 41 | Two layers: precoding is performed according to a latest PMI reported by a PUSCH<br>Codeword 0: $0^{th}$ power allocation value<br>Codeword 1: $2^{nd}$ power allocation value |
| | | 42 | Two layers: precoding is performed according to a precoding matrix $\frac{1}{2}\begin{bmatrix}1 & 1\\1 & -1\end{bmatrix}$<br>Codeword 0: $1^{st}$ power allocation value<br>Codeword 1: $2^{nd}$ power allocation value |
| | | 43 | Two layers: precoding is performed according to a precoding matrix $\frac{1}{2}\begin{bmatrix}1 & 1\\j & -j\end{bmatrix}$<br>Codeword 0: $1^{st}$ power allocation value<br>Codeword 1: $2^{nd}$ power allocation value |
| | | 44 | Two layers: precoding is performed according to a latest PMI reported by a PUSCH<br>Codeword 0: $1^{st}$ power allocation value<br>Codeword 1: $2^{nd}$ power allocation value |
| | | 45 | Two layers: precoding is performed according to a precoding matrix $\frac{1}{2}\begin{bmatrix}1 & 1\\1 & -1\end{bmatrix}$<br>Codeword 0: $2^{nd}$ power allocation value<br>Codeword 1: $2^{nd}$ power allocation value |
| | | 46 | Two layers: precoding is performed according to a precoding matrix $\frac{1}{2}\begin{bmatrix}1 & 1\\j & -j\end{bmatrix}$<br>Codeword 0: $2^{nd}$ power allocation value<br>Codeword 1: $2^{nd}$ power allocation value |
| | | 47 | Two layers: precoding is performed according to a latest PMI reported by a PUSCH<br>Codeword 0: $2^{nd}$ power allocation value<br>Codeword 1: $2^{nd}$ power allocation value |

TABLE 11-continued

| Single codeword | | Dual codeword | |
|---|---|---|---|
| Value corresponding to a bit | Indicated meaning | Value corresponding to a bit | Indicated meaning |
| | | 48 to 63 | Reserved |

It should be noted that, Table 5 to Table 11 are merely examples for describing a correspondence between a value corresponding to a bit included in the field and an indicated meaning, and this embodiment of the present invention is not limited thereto. In addition, the codeword 0/codeword 1 may also be referred to as a transport block 1/transport block 2 or a spatial layer 0/spatial layer 1. In addition, a specific value corresponding to the $0^{th}/1^{st}/2^{nd}$ power allocation value in Table 5 to Table 11 may vary according to different modulation schemes of the terminal.

It should be noted that, the base station may send downlink data transmit power ratio/coefficient information or indication information of downlink data transmit power ratio/coefficient information to all accessed or scheduled terminals, or to only a terminal in the paired transmission mode.

It may be learned that, in this embodiment of the present invention, in addition to sending indication information of a transmission mode to the terminal, the base station may send the downlink data transmit power ratio/coefficient information or the indication information of the downlink data transmit power ratio/coefficient information to the terminal, so that the downlink data transmit power ratio/coefficient information is relatively flexibly configured while reliability of data demodulation performed by the terminal is improved and complexity of data demodulation performed by the terminal is reduced.

The terminal can determine the downlink data transmit power ratio/coefficient information according to a modulation scheme of data sent by the base station to the terminal. Therefore, based on the foregoing embodiment, the base station may further send, to the other terminal, information about a set including all possible used modulation schemes of one terminal in a pair of terminals in the paired transmission mode. Specifically, the base station may semi-statically send, by using broadcast signaling or RRC signaling or the like, the information about the set including all the possible used modulation schemes. For ease of description herein, the modulation scheme for the data sent by the base station to the terminal may also be referred to as a modulation scheme used by the terminal.

Alternatively, the base station may not send the information about the set including all the possible used modulation schemes, but pre-store, in the terminal, information about a set related to all the possible used modulation schemes. Alternatively, the base station may send, to the other terminal, a specific modulation scheme used by one terminal in a pair of terminals in the paired transmission mode. Specifically, the base station may dynamically send the used specific modulation scheme. For example, a field indicating the specific modulation scheme used by the one terminal may be added to DCI and sent to the other terminal by using a PDCCH.

Figure 3:
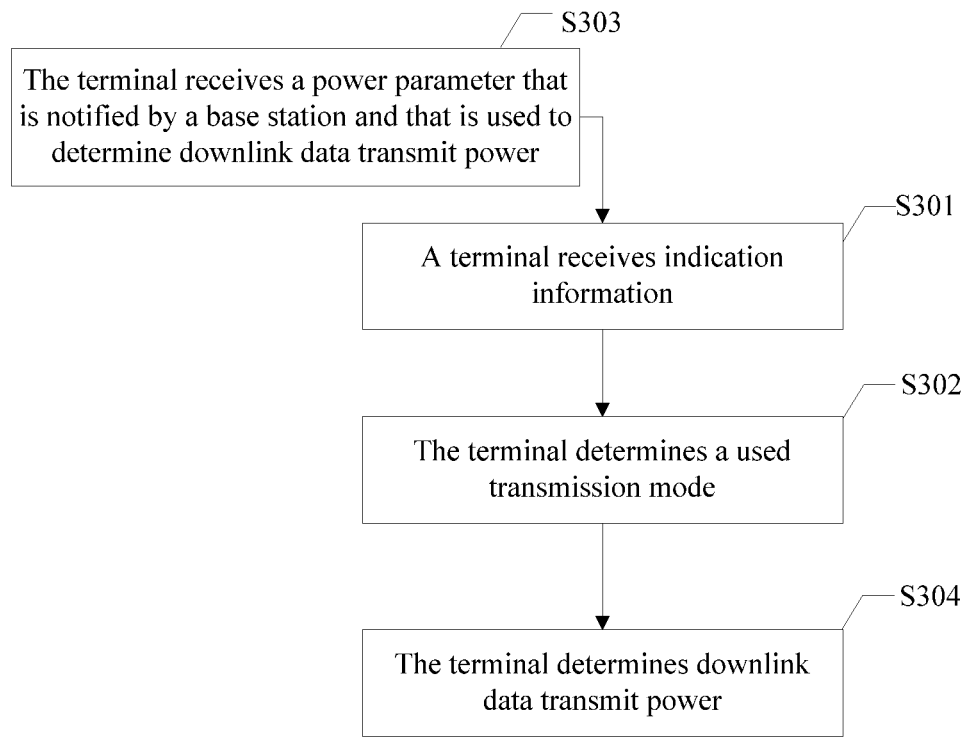
FIG. 3 is a flowchart of a wireless communication method according to another embodiment of the present invention.

As shown in FIG. 3, another embodiment of the present invention further provides a wireless communication method. The method may be implemented by using a terminal that can support a MUST system, and may include the following step:

S301. The terminal receives information that indicates a terminal type corresponding to a transmission mode and that is sent by a base station, where the transmission mode is a transmission mode that is determined by the base station and that is used to send data to the terminal in a current scheduling period, and is one of a paired transmission mode or a non-paired transmission mode.

For specific descriptions of the paired transmission mode, the non-paired transmission mode, and specific information indicating the terminal type corresponding to the transmission mode, refer to the related descriptions in the foregoing embodiment. Details are not described herein again.

S302. The terminal obtains, according to the information indicating the terminal type corresponding to the transmission mode, a transmission mode used by the terminal.

After receiving the information sent by the base station in S301, the terminal may parse the information, to learn of a specific transmission mode used by the terminal. In addition, further, if the terminal learns that the terminal uses the paired transmission mode, the terminal may further learn, by using the information, whether the terminal is a near terminal or a far terminal in the paired transmission mode.

In this embodiment of the present invention, the terminal can determine, according to the information sent by the base station, the transmission mode configured for the terminal, so that the terminal can perform corresponding processing according to the transmission mode, thereby improving processing efficiency. For example, the terminal may select an adaptive receiving algorithm to demodulate a signal, to improve demodulation efficiency and accuracy.

Further, in this embodiment of the present invention, the terminal can determine downlink data transmit power with reference to the transmission mode used by the terminal. This embodiment of the present invention may further include the following step:

S303. The terminal receives a power parameter that is notified by the base station and that is used to determine downlink data transmit power.

For a specific description of the power parameter $PA_{MUST}$, refer to the related descriptions in the foregoing embodiment. Details are not described herein again.

As described above, $PA_{MUST}$ may be an existing parameter or a new understanding of an existing parameter, or a newly defined parameter different from the existing parameter. When $PA_{MUST}$ is the existing parameter or the new understanding of the existing parameter, the power parameter received by the terminal and used to determine the downlink data transmit power is $PA_{MUST}$. When $PA_{MUST}$ is the newly defined parameter, the power parameter received by the terminal and used to determine the downlink data transmit power includes $P_A$ defined in an existing protocol and $PA_{MUST}$.

The base station may semi-statically notify the power parameter, and accordingly, S303 may be implemented before S301.

S304. The terminal determines the downlink data transmit power according to energy per resource element of a cell-specific reference signal, the power parameter used to determine the downlink data transmit power, and the information indicating the transmission mode used by the base station to send data to the terminal in the current scheduling period.

When $PA_{MUST}$ is the existing parameter or the new understanding of the existing parameter, the terminal determines the downlink data transmit power by using $PA_{MUST}$ without distinguishing used transmission modes. When $PA_{MUST}$ is the newly defined parameter, the terminal determines, according to the obtained transmission mode used by the terminal, whether to use $PA_{MUST}$ or $P_A$ to determine the downlink data transmit power.

Specifically, if the terminal learns that the non-paired transmission mode is configured for the terminal, the terminal may determine the downlink data transmit power according to a method in the prior art. For example, with reference to a related definition in section 5.2 of 3GPP TS 36.213 V12.3.0 (2014.09), the terminal can obtain, according to $PA_{MUST}$ or $P_A$, and the energy per resource element of the cell-specific reference signal (cell-specific RS EPRE), for example, energy per resource element (energy per resource element, EPRE) of a physical downlink shared channel (physical downlink shared channel, PDSCH), downlink data transmit power that is used by the base station to send data to the terminal. If the terminal learns that the terminal is configured as a far terminal in the paired transmission mode, the terminal may determine, according to downlink data transmit power ratio/coefficient information, a downlink data transmit power share occupied by the far terminal in downlink data transmit power of a pair of terminals in the paired transmission mode, and further determine, according to the determined share, $PA_{MUST}$, and the energy per resource element of the cell-specific reference signal, downlink data transmit power that is used by the base station to send data to the far terminal. If the terminal learns that the terminal is configured as a near terminal in the paired transmission mode, the near terminal may determine, according to downlink data transmit power ratio/coefficient information, a downlink data transmit power share occupied by the near terminal in downlink data transmit power of a pair of terminals in the paired transmission mode, and further determine, according to the determined share, $PA_{MUST}$, and the energy per resource element of the cell-specific reference signal, downlink data transmit power that is used by the base station to send data to the near terminal.

As described above, the downlink data transmit power ratio/coefficient information may be sent by the base station, and the terminal may obtain the downlink data transmit power ratio/coefficient information according to the information sent by the base station. Alternatively, the downlink data transmit power ratio/coefficient information may be stored in the terminal, and the terminal can directly obtain the downlink data transmit power ratio/coefficient information when the terminal needs to use the downlink data transmit power ratio/coefficient information. The downlink data transmit power ratio/coefficient information may have a fixed value, or may have a flexibly selected value. For details, refer to the foregoing related descriptions. Details are not described herein again.

Further, a manner in which a near terminal/far terminal determines, according to downlink data transmit power ratio/coefficient information, a downlink data transmit power share occupied by the near terminal/far terminal may be as follows. A case in which the downlink data transmit power ratio/coefficient information is a downlink data transmit power ratio/coefficient, and a case in which the downlink data transmit power ratio/coefficient information is a downlink data transmit power ratio/coefficient set is separately described below:

1. The downlink data transmit power ratio/coefficient information is a downlink data transmit power ratio/coefficient:

Assuming that the terminal determines, according to a downlink data transmit power ratio, a downlink data transmit power share occupied by the terminal, manners in which the terminal determines the downlink data transmit power share occupied by the terminal may slightly vary according to representation forms of the downlink data transmit power ratio.

For example, for the foregoing form, that is, a ratio of downlink data transmit power of a near terminal to downlink data transmit power of a far terminal=X:Y, a downlink data transmit power share occupied by the near terminal is X, and a downlink data transmit power share occupied by the far terminal is Y. Accordingly, assuming that PDSCH ERPE obtained by means of calculation according to $PA_{MUST}$ with reference to the related definition in the section 5.2 of the 3GPP TS 36.213 V12.3.0 (2014.09) is P, downlink data transmit power used by the base station to send data to the near terminal is P*X, and downlink data transmit power used by the base station to send data to the far terminal is P*Y.

For example, for the foregoing form, that is, a ratio of downlink data transmit power of a far terminal to downlink data transmit power of a near terminal=B:A, a downlink data transmit power share occupied by the near terminal is A/(A+B), and a downlink data transmit power share occupied by the far terminal is B/(A+B). A specific formula for calculating downlink data transmit power that is used by the base station to send data to the near terminal or the far terminal may be similar to a calculation manner of P*X, and examples are not enumerated one by one herein.

Assuming that the terminal determines, according to a downlink data transmit power coefficient, a downlink data transmit power share occupied by the terminal, the coefficient is the downlink data transmit power share occupied by the terminal.

2. The downlink data transmit power ratio/coefficient information is a downlink data transmit power ratio/coefficient set:

Regardless of whether a downlink data transmit power share occupied by the terminal is determined according to a downlink data transmit power ratio set or a downlink data transmit power coefficient set, the terminal may determine a specific downlink data transmit power ratio/coefficient from the foregoing sets by using a blind detection method, to determine a downlink data transmit power share. For example, the terminal may try in the foregoing sets one by one, to determine a downlink data transmit power share according to a maximum likelihood criterion. A difference lies in that, if the downlink data transmit power ratio set is used, the terminal further needs to perform conversion or determining to obtain a specific downlink data transmit power share occupied by the far terminal or the near terminal.

In the foregoing embodiment, the terminal determines the downlink data transmit power according to the energy per resource element of the cell-specific reference signal, the power parameter, and the information indicating the terminal type corresponding to the transmission mode, thereby improving reliability of data demodulation performed by the terminal and reducing complexity of data demodulation performed by the terminal.

Further, after determining the downlink data transmit power and completing data demodulation, the terminal may further feed back, to the base station, information indicating whether demodulation succeeds, so that the base station determines whether to retransmit data, so as to improve reliability of data transmission. For a specific demodulation scheme, refer to a scheme in the prior art. For example, when a cyclic redundancy check value of a data signal is 0, it is determined that the current data signal is demodulated successfully; or when a cyclic redundancy check value of a data signal is 1, it is determined that the current data signal is demodulated unsuccessfully.

Further, if the downlink data transmit power ratio/coefficient information is pre-stored in a terminal, a terminal in the paired transmission mode may further obtain a modulation scheme of data sent by the base station to the other terminal in a pair of terminals in the paired transmission mode, to determine a specific downlink data transmit power ratio/coefficient. For example, it is assumed that UE 1 stores two sets: {0.1:0.9,0.15:0.85,0.2:0.8,0.25:0.75,0.3:0.7,0.35: 0.65,0.4:0.6} and {0.2:0.8,0.25:0.75,0.3:0.7,0.35:0.65,0.4: 0.6}, and a modulation scheme of data sent by the base station to the UE 1 is QPSK. If the UE 1 learns that a modulation scheme of data sent by the base station to UE 2 is also QPSK, the UE 1 may perform blind detection only in {0.1:0.9,0.15:0.85,0.2:0.8,0.25:0.75,0.3:0.7,0.35:0.65,0.4: 0.6}, so as to reduce algorithm complexity and a calculation amount.

Figure 4:
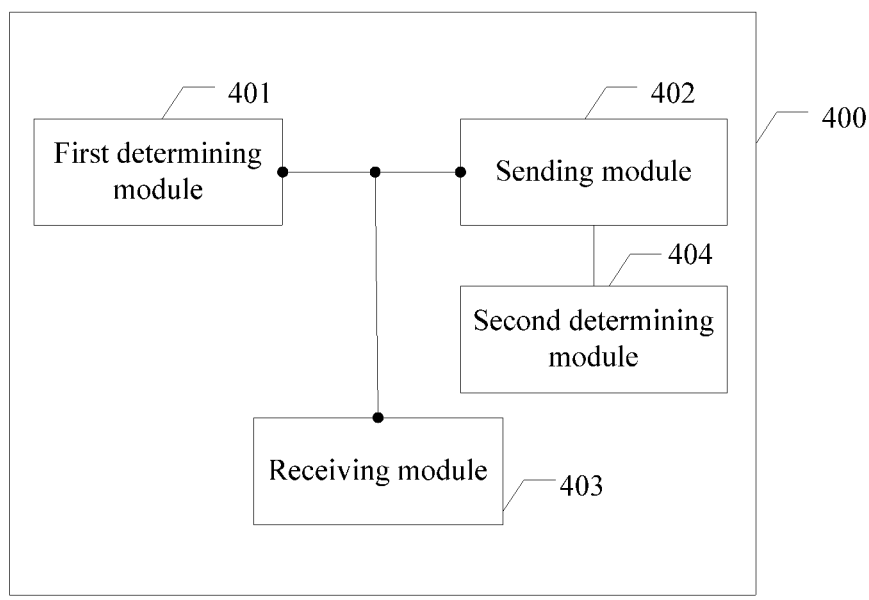
FIG. 4 is a schematic structural diagram of a base station according to an embodiment of the present invention.

An embodiment of the present invention further provides a base station 400. The base station 400 can implement steps/behaviors in the method performed by a base station in the foregoing embodiment. For example, as shown in FIG. 4, the base station 400 can support a MUST system, and includes:

a first determining module 401, configured to determine a transmission mode used to send data to a terminal in a current scheduling period, where the transmission mode is one of a paired transmission mode or a non-paired transmission mode; and a sending module 402, configured to send, to the terminal, information indicating a terminal type corresponding to the transmission mode.

The first determining module 401 may determine a transmission mode for each currently scheduled terminal according to different requirements or factors. For a specific manner, refer to the related descriptions in the method embodiment.

In addition, for specific manners in which the sending module 402 indicates the terminal type corresponding to the transmission mode and transfers, to the terminal, the information indicating the terminal type corresponding to the transmission mode, refer to the related descriptions in the method embodiment.

According to the base station 400 in this embodiment of the present invention, the terminal can learn of transmission mode information, so that the terminal can perform corresponding processing according to the transmission mode. For example, the terminal may select an adaptive receiving algorithm to demodulate a signal, to improve demodulation efficiency and accuracy.

Further, the terminal may determine downlink data transmit power according to a corresponding transmission mode. To enable the terminal to obtain the downlink data transmit power, the sending module 402 in this embodiment of the present invention may be further configured to notify the terminal of a power parameter used to determine downlink data transmit power. The power parameter includes $PA_{MUST}$.

If $PA_{MUST}$ is an existing parameter or a new understanding of an existing parameter, the power parameter notified by the sending module 402 to the terminal and used to determine the downlink data transmit power is $PA_{MUST}$. If $PA_{MUST}$ is a newly defined parameter different from the existing parameter, the power parameter notified by the sending module 402 to the terminal and used to determine the downlink data transmit power includes $PA_{MUST}$ and $P_A$.

The sending module 402 may send a same $PA_{MUST}$ to all terminal pairs in the paired transmission mode in a cell, or may send a separate $PA_{MUST}$ to each pair of paired transmission terminals. $PA_{MUST}$ values of different pairs of terminals in the paired transmission mode may be equal or unequal.

In the foregoing embodiment, the base station notifies the terminal of the power parameter used to determine the downlink data transmit power, so that the terminal can learn of the downlink data transmit power, thereby improving reliability of data demodulation performed by the terminal and reducing complexity of data demodulation performed by the terminal.

In addition, the base station 400 may further include a receiving module 403, configured to receive feedback information sent by the terminal. The feedback information is information that indicates whether demodulation succeeds and that is fed back by the terminal after the terminal performs demodulation based on the information indicating the terminal type corresponding to the transmission mode, the power parameter used to determine the downlink data transmit power, and energy per resource element of a cell-specific reference signal, or the feedback information is information that indicates whether demodulation succeeds and that is fed back by the terminal after the terminal performs demodulation based on the information indicating the terminal type corresponding to the transmission mode, downlink data transmit power ratio/coefficient information, the power parameter used to determine the downlink data transmit power, and energy per resource element of a cell-specific reference signal.

For downlink data transmit power ratios/coefficients of two terminals in the paired transmission mode, refer to the related descriptions in the foregoing embodiment. In this embodiment of the present invention, for example, by receiving the information that indicates whether demodulation succeeds and that is sent by the terminal, the base station can determine whether to retransmit data, so as to improve reliability of data transmission.

Further, in this embodiment of the present invention, the base station may send a downlink data transmit power ratio/coefficient or a downlink data transmit power ratio/coefficient set to the terminal. In this case, the sending module 402 may be further configured to send the downlink data transmit power ratio/coefficient information or indication information of the downlink data transmit power ratio/coefficient information to the terminal. The sending module 402 may specifically send the downlink data transmit power ratio/coefficient information or the indication information of the downlink data transmit power ratio/coefficient information to the terminal by using higher layer signaling or downlink control information.

Further, the sending module 402 may further send at least one of indication information of a demodulation reference signal DMRS port of a paired terminal of the terminal or indication information of a modulation scheme of a paired terminal of the terminal to the terminal by using a first field. Optionally, the first field may indicate a type of the terminal, and the demodulation pilot DMRS port and the modulation scheme of the paired terminal of the terminal in a joint coding manner.

Alternatively, the sending module 402 may be further configured to send a second field to the terminal, and the second field indicates the downlink data transmit power ratio/coefficient information and the terminal type corresponding to the transmission mode. The terminal type corresponding to the transmission mode includes a transmission mode corresponding to the terminal at each spatial layer, and the downlink data transmit power ratio/coefficient information includes a value of a downlink data transmit power ratio/coefficient of the terminal at each spatial layer or an index of a downlink data transmit power ratio/coefficient of the terminal at each spatial layer. For specific functions and implementations of the sending module, refer to the related descriptions in the method embodiment. Details are not described herein again.

In addition, in this embodiment of the present invention, the base station 400 may further include a second determining module 404, configured to determine the downlink data transmit power ratio/coefficient information. For example, the second determining module 404 may determine the downlink data transmit power ratio/coefficient information according to a signal modulation scheme used by the terminal and a signal to interference plus noise ratio of the terminal. For details, refer to the related descriptions in the method embodiment. The sending module 402 is specifically configured to send, to the terminal, the downlink data transmit power ratio/coefficient information determined by the second determining module 404 or information indicating the downlink data transmit power ratio/coefficient information determined by the second determining module 404.

In addition, the sending module 402 may be further configured to send, to the other terminal, information about a modulation scheme used by one terminal in a pair of terminals in the paired transmission mode. For example, the sending module 402 may send, to the other terminal, a specific modulation scheme used by one terminal in a pair of terminals in the paired transmission mode, or send, to the other terminal, information about a set including all possible used modulation schemes of one terminal in a pair of terminals in the paired transmission mode. This is not limited in this embodiment of the present invention.

It may be understood that, the first determining module 401 and the second determining module 404 may be implemented by using a processor. The processor may be a central processing unit (CPU) or another general purpose processor, a digital signal processor (DSP), an application-specific integrated circuit (ASIC), a field programmable gate array (FPGA) or another programmable logical device, a discrete gate or transistor logic device, a discrete hardware component, or the like. The general purpose processor may be a microprocessor, or the processor may be any conventional processor or the like. The sending module 402 may be implemented by using a transmitter, and the receiving module 403 may be implemented by using a receiver. Functional modules are separately implemented by respective corresponding hardware units. It may be understood that, functions of functional modules of the base station in this embodiment of the present invention may be specifically implemented according to the method in the method embodiment. For specific implementation processes of the functions, refer to the related descriptions in the method embodiment. Details are not described herein again. It should be understood that, the receiver and the transmitter herein may implement related operations, for example, by using a radio frequency circuit, and the radio frequency circuit may be configured to send and receive information or a signal.

Figure 5:
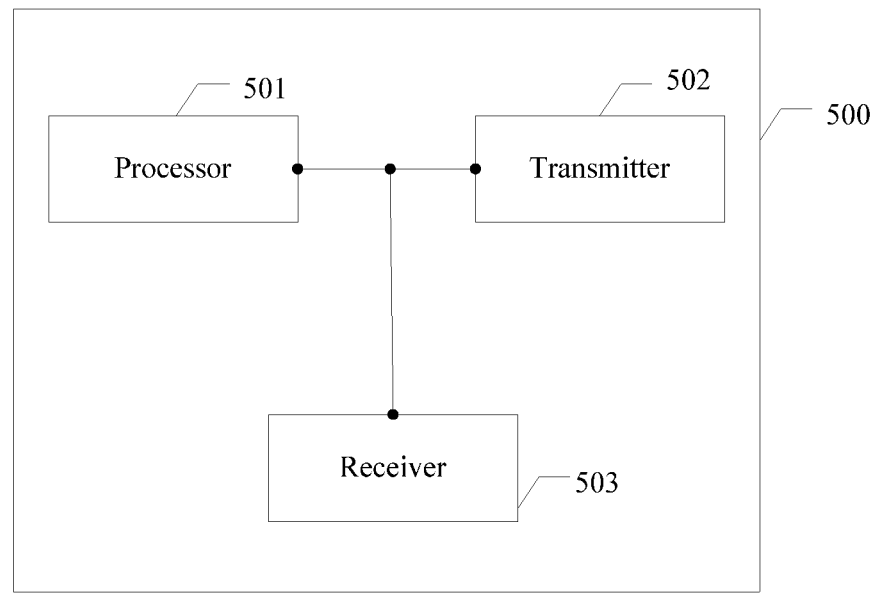
FIG. 5 is a schematic structural diagram of a base station according to another embodiment of the present invention.

Another embodiment of the present invention further provides a base station 500. The base station 500 can implement steps/behaviors in the method performed by a base station in the foregoing embodiment. For example, the base station 500 can support a MUST system. As shown in FIG. 5, the base station 500 includes: a processor 501, configured to determine a transmission mode used to send data to a terminal in a current scheduling period, where the transmission mode is one of a paired transmission mode or a non-paired transmission mode; and a transmitter 502, configured to send, to the terminal, information indicating a terminal type corresponding to the transmission mode.

In addition, the transmitter 502 may be further configured to notify the terminal of a power parameter used to determine downlink data transmit power, where the power parameter includes $PA_{MUST}$.

The base station 500 may further include a receiver 503, configured to receive feedback information sent by the terminal, where the feedback information is information that indicates whether demodulation succeeds and that is fed back by the terminal after the terminal performs demodulation based on the information indicating the terminal type corresponding to the transmission mode, the power parameter used to determine the downlink data transmit power, and energy per resource element of a cell-specific reference signal, or the feedback information is information that indicates whether demodulation succeeds and that is fed back by the terminal after the terminal performs demodulation based on the information indicating the terminal type corresponding to the transmission mode, downlink data transmit power ratio/coefficient information, the power parameter used to determine the downlink data transmit power, and energy per resource element of a cell-specific reference signal.

Further, the transmitter 502 may be further configured to send the downlink data transmit power ratio/coefficient information or indication information of the downlink data transmit power ratio/coefficient information to the terminal. The transmitter 502 may specifically send the downlink data transmit power ratio/coefficient information or the indication information of the downlink data transmit power ratio/coefficient information to the terminal by using higher layer signaling or downlink control information.

Further, the transmitter 502 may further send at least one of indication information of a demodulation reference signal DMRS port of a paired terminal of the terminal or indication information of a modulation scheme of a paired terminal of the terminal to the terminal by using a first field. Optionally, the first field may indicate a type of the terminal, and the demodulation pilot DMRS port and the modulation scheme of the paired terminal of the terminal in a joint coding manner.

Alternatively, the transmitter 502 may be further configured to send a second field to the terminal, and the second field indicates the downlink data transmit power ratio/coefficient information and the terminal type corresponding to the transmission mode. The terminal type corresponding to the transmission mode includes a transmission mode corresponding to the terminal at each spatial layer, and the downlink data transmit power ratio/coefficient information includes a value of a downlink data transmit power ratio/coefficient of the terminal at each spatial layer or an index of a downlink data transmit power ratio/coefficient of the terminal at each spatial layer.

The processor 501 may be further configured to determine the downlink data transmit power ratio/coefficient information, for example, the processor 501 may determine the downlink data transmit power ratio/coefficient information according to a signal modulation scheme used by the terminal and a signal to interference plus noise ratio of the terminal. For details, refer to the related descriptions in the method embodiment.

In addition, the transmitter 502 may be further configured to send, to the other terminal, information about a modulation scheme used by one terminal in a pair of terminals in the paired transmission mode. For example, the transmitter 502 may send, to the other terminal, a specific modulation scheme used by one terminal in a pair of terminals in the paired transmission mode, or send, to the other terminal, information about a set including all possible used modulation schemes of one terminal in a pair of terminals in the paired transmission mode. This is not limited in this embodiment of the present invention.

It may be understood that, for specific implementations of and interaction relationships between the processor 501, the transmitter 502, and the receiver 503 of the base station in this embodiment of the present invention, refer to the specific descriptions of the method in the method embodiment. Details are not described herein again. It should be understood that, the receiver and the transmitter herein may implement related operations, for example, by using a radio frequency circuit, and the radio frequency circuit may be configured to send and receive information or a signal.

Figure 6:
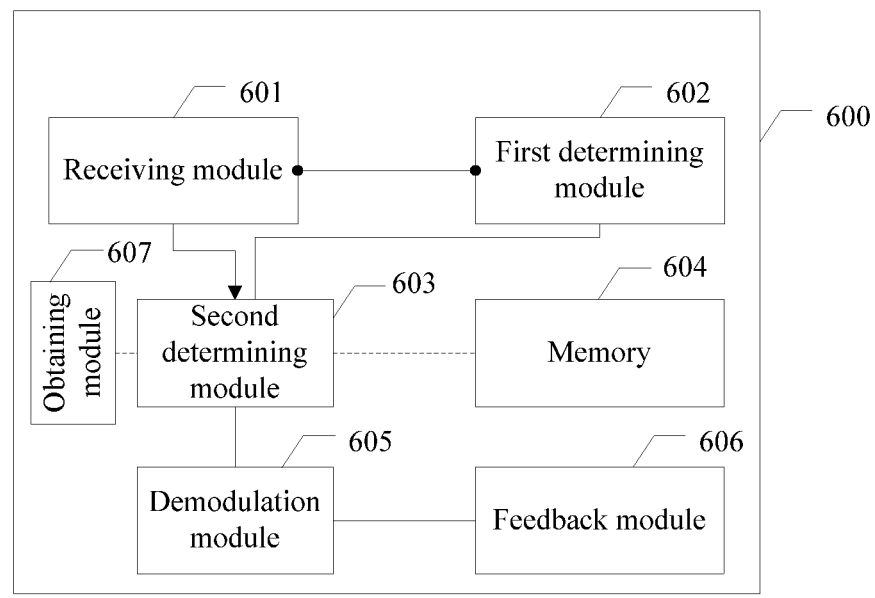
FIG. 6 is a schematic structural diagram of a terminal according to an embodiment of the present invention.

An embodiment of the present invention provides a terminal 600. The terminal 600 can implement steps/behaviors in the method performed by a terminal in the foregoing embodiment. For example, the terminal 600 can support a MUST system. As shown in FIG. 6, the terminal 600 includes:

a receiving module 601, configured to receive information that indicates a terminal type corresponding to a transmission mode and that is sent by a base station, where the transmission mode is a transmission mode that is determined by the base station and that is used to send data to the terminal in a current scheduling period, and is one of a paired transmission mode or a non-paired transmission mode; and a first determining module 602, configured to determine, according to the information received by the receiving module 601, a transmission mode used by the terminal 600.

In this embodiment of the present invention, the terminal 600 can determine, according to the information sent by the base station, the used transmission mode, so that the terminal can perform corresponding processing according to the transmission mode, thereby improving processing efficiency. For example, the terminal 600 may select an adaptive receiving algorithm to demodulate a signal, to improve demodulation efficiency and accuracy.

Further, in this embodiment of the present invention, the terminal may determine downlink data transmit power with reference to the used transmission mode. In this case, the receiving module 601 is further configured to receive a power parameter that is notified by the base station and that is used to the determine downlink data transmit power. As described above, $PA_{MUST}$ may be an existing parameter or a new understanding of an existing parameter, or a newly defined parameter different from the existing parameter. When $PA_{MUST}$ is the existing parameter or the new understanding of the existing parameter, the power parameter received by the terminal and used to determine the downlink data transmit power is $PA_{MUST}$. When $PA_{MUST}$ is the newly defined parameter, the power parameter received by the terminal and used to determine the downlink data transmit power includes $P_A$ defined in an existing protocol and $PA_{MUST}$.

A second determining module 603 is configured to determine the downlink data transmit power according to energy per resource element of a cell-specific reference signal, the power parameter received by the receiving module 601 and used to determine the downlink data transmit power, and the transmission mode determined by the first determining module 601 and used by the terminal 600.

If the terminal 600 learns, according to the information indicating the transmission mode used by the base station to send data to the terminal in the current scheduling period, that the non-paired transmission mode is configured for the terminal, the terminal 600 may determine the downlink data transmit power according to a method in the prior art. If the terminal 600 learns, according to the information indicating the transmission mode used by the base station to send data to the terminal 600 in the current scheduling period, that the terminal 600 is configured as a far terminal in the paired transmission mode, the terminal 600 may determine, according to downlink data transmit power ratio/coefficient information, a downlink data transmit power share occupied by the far terminal in downlink data transmit power of a pair of terminals in the paired transmission mode, and further determine, according to the determined share, $PA_{MUST}$, and the energy per resource element of the cell-specific reference signal, downlink data transmit power that is used by the base station to send data to the far terminal. If the terminal 600 learns, according to the information indicating the transmission mode used by the base station to send data to the terminal in the current scheduling period, that the terminal 600 is configured as a near terminal in the paired transmission mode, the terminal 600 may determine, according to downlink data transmit power ratio/coefficient information, a downlink data transmit power share occupied by the near terminal in downlink data transmit power of a pair of terminals in the paired transmission mode, and further determine, according to the determined share, $PA_{MUST}$, and the energy per resource element of the cell-specific reference signal, downlink data transmit power that is used by the base station to send data to the near terminal.

As described above, the downlink data transmit power ratio/coefficient information may be sent by the base station, and the terminal may obtain the downlink data transmit power ratio/coefficient information according to the information sent by the base station. Alternatively, the downlink data transmit power ratio/coefficient information may be stored in the terminal, and the terminal can directly obtain the downlink data transmit power ratio/coefficient information when the terminal needs to use the downlink data transmit power ratio/coefficient information.

When the downlink data transmit power ratio/coefficient information is sent by the base station, the receiving module 601 may be further configured to receive the downlink data transmit power ratio/coefficient information sent by the base station. For a specific description of the downlink data transmit power ratio/coefficient information, refer to the related descriptions in the foregoing embodiment. Details are not described herein again. The receiving module 601 may receive the downlink data transmit power ratio/coefficient information or indication information of the downlink data transmit power ratio/coefficient information by using a second field. Specifically, the second field indicates the downlink data transmit power ratio/coefficient information and the terminal type corresponding to the transmission mode. The terminal type corresponding to the transmission mode includes a transmission mode corresponding to the terminal at each spatial layer, and the downlink data transmit power ratio/coefficient information includes a value of a downlink data transmit power ratio/coefficient of the terminal at each spatial layer or an index of a downlink data transmit power ratio/coefficient of the terminal at each spatial layer. Further, the second field may further indicate precoding information. In this case, the second field indicates information about the terminal type corresponding to the transmission mode, the downlink data transmit power ratio/coefficient information, and the precoding information in a joint coding manner.

Optionally, the receiving module 601 may be further configured to receive a first field, where the first field includes at least one of indication information of a demodulation reference signal DMRS port of a paired terminal of the terminal or indication information of a modulation scheme of a paired terminal of the terminal. Specifically, the first field indicates a type of the terminal, and the demodulation pilot DMRS port and the modulation scheme of the paired terminal of the terminal in a joint coding manner.

When the downlink data transmit power ratio/coefficient information is stored in the terminal, the terminal 600 may further include a memory 604, configured to store the downlink data transmit power ratio/coefficient information.

Further, the terminal 600 may further include a demodulation module 605, configured to complete data demodulation according to the downlink data transmit power determined by the second determining module 603; and a feedback module 606, configured to feed back, to the base station, information indicating whether demodulation succeeds.

In addition, if the downlink data transmit power ratio/coefficient information is pre-stored in a terminal, a terminal in the paired transmission mode may further include an obtaining module 607, configured to obtain information about a modulation scheme used by the other terminal in a pair of terminals in the paired transmission mode. For example, the obtaining module 607 may obtain a specific modulation scheme used by the other terminal in the pair of terminals in the paired transmission mode, or obtain information about a set including all possible used modulation schemes of the other terminal in the pair of terminals in the paired transmission mode. This is not limited in this embodiment of the present invention. Specifically, the terminal may obtain, according to related information sent by the base station, the information about the modulation scheme used by the other terminal in the pair of terminals in the paired transmission mode, or may obtain, according to modulation scheme information pre-stored in the terminal, the information about the modulation scheme used by the other terminal in the pair of terminals in the paired transmission mode. This is not limited in this embodiment of the present invention. After the obtaining module 607 obtains the modulation scheme used by the other terminal in the paired transmission mode, the second determining module 603 is further configured to determine a downlink data transmit power ratio/coefficient according to the obtained modulation scheme, to determine the downlink data transmit power.

It may be understood that, the first determining module 602, the second determining module 603, and the obtaining module 607 may be implemented by using a processor. The processor may be a central processing unit (CPU) or another general purpose processor, a digital signal processor (DSP), an application-specific integrated circuit (ASIC), a field programmable gate array (FPGA) or another programmable logical device, a discrete gate or transistor logic device, a discrete hardware component, or the like. The general purpose processor may be a microprocessor or the processor may be any conventional processor or the like. The feedback module 606 may be implemented by using a transmitter, the receiving module 601 may be implemented by using a receiver, and the demodulation module 605 may be implemented by using a processor. Functional modules are separately implemented by respective corresponding hardware units. It may be understood that, functions of functional modules of the terminal in this embodiment of the present invention may be specifically implemented according to the method in the method embodiment. For specific implementation processes of the functions, refer to the related descriptions in the method embodiment. Details are not described herein again. It should be understood that, the receiver and the transmitter herein may implement related operations, for example, by using a radio frequency circuit, and the radio frequency circuit may be configured to send and receive information or a signal.

Figure 7:
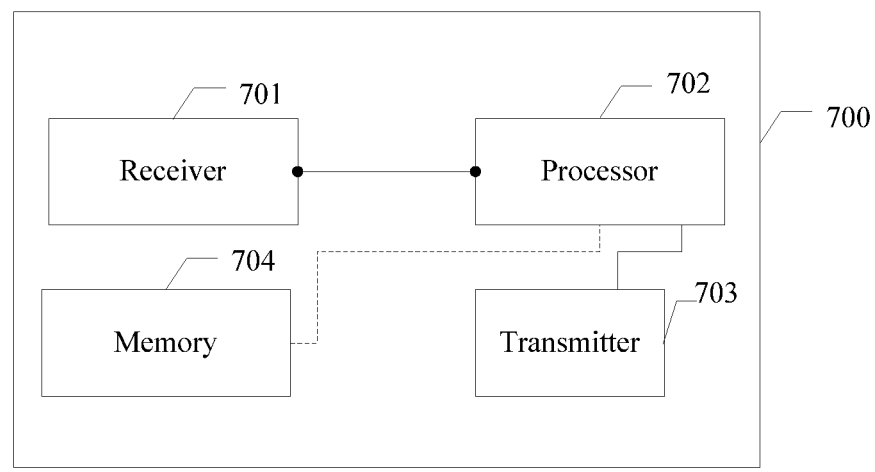
FIG. 7 is a schematic structural diagram of a terminal according to another embodiment of the present invention.

Another embodiment of the present invention further provides a terminal 700. The terminal 700 can implement steps/behaviors in the method performed by a terminal in the foregoing embodiment. For example, the terminal 700 can support a MUST system. As shown in FIG. 7, the terminal 700 may include:

a receiver 701, configured to receive information that indicates a terminal type corresponding to a transmission mode and that is sent by a base station, where the transmission mode is a transmission mode that is determined by the base station and that is used to send data to the terminal in a current scheduling period, and is one of a paired transmission mode or a non-paired transmission mode; and a processor 702, configured to determine, according to the information that indicates the transmission mode used by the base station to send data to the terminal in the current scheduling period and that is received by the receiver 701, a transmission mode used by the terminal 700.

Further, the receiver 701 may be further configured to receive a power parameter that is notified by the base station and that is used to determine downlink data transmit power. For the power parameter and a manner of notifying the power parameter, refer to the related descriptions in the foregoing embodiment.

Further, in this embodiment of the present invention, the terminal may determine the downlink data transmit power with reference to the used transmission mode. In this case, the processor 702 may be further configured to determine the downlink data transmit power according to energy per resource element of a cell-specific reference signal, the power parameter received by the receiver 701 and used to determine the downlink data transmit power, and the information indicating the transmission mode used by the base station to send data to the terminal in the current scheduling period.

Further, the processor 702 may further complete data demodulation according to the determined downlink data transmit power. In this case, it may be considered that the processor 702 includes a demodulation module, and the transmitter 703 is configured to feed back, to the base station, information indicating whether demodulation succeeds.

As described above, downlink data transmit power ratio/coefficient information may be sent by the base station, and the terminal may obtain the downlink data transmit power ratio/coefficient information according to the information sent by the base station. Alternatively, the downlink data transmit power ratio/coefficient information may be stored in the terminal, and the terminal can directly obtain the downlink data transmit power ratio/coefficient information when the terminal needs to use the downlink data transmit power ratio/coefficient information. Further, when the downlink data transmit power ratio/coefficient information is sent by the base station, the receiver 701 may be further configured to receive the downlink data transmit power ratio/coefficient information sent by the base station. For a specific description of the downlink data transmit power ratio/coefficient information, refer to the related descriptions in the foregoing embodiment. Details are not described herein again. The receiver 701 may receive the downlink data transmit power ratio/coefficient information or indication information of the downlink data transmit power ratio/coefficient information by using a second field. Specifically, the second field indicates the downlink data transmit power ratio/coefficient information and the terminal type corresponding to the transmission mode. The terminal type corresponding to the transmission mode includes a transmission mode corresponding to the terminal at each spatial layer, and the downlink data transmit power ratio/coefficient information includes a value of a downlink data transmit power ratio/coefficient of the terminal at each spatial layer or an index of a downlink data transmit power ratio/coefficient of the terminal at each spatial layer. Further, the second field may further indicate precoding information. In this case, the second field indicates information about the terminal type corresponding to the transmission mode, the downlink data transmit power ratio/coefficient information, and the precoding information in a joint coding manner.

Optionally, the receiver 701 may be further configured to receive a first field, where the first field includes at least one of indication information of a demodulation reference signal DMRS port of a paired terminal of the terminal or indication information of a modulation scheme of a paired terminal of the terminal. Specifically, the first field indicates a type of the terminal, and the demodulation pilot DMRS port and the modulation scheme of the paired terminal of the terminal in a joint coding manner.

When the downlink data transmit power ratio/coefficient information is stored in the terminal, the terminal 700 may further include a memory 704, configured to store the downlink data transmit power ratio/coefficient information.

In addition, if the downlink data transmit power ratio/coefficient information is pre-stored in a terminal, for a terminal in the paired transmission mode, the processor 702 may be further configured to obtain information about a modulation scheme used by the other terminal in a pair of terminals in the paired transmission mode. For example, the processor 702 may obtain a specific modulation scheme used by the other terminal in the pair of terminals in the paired transmission mode, or may obtain information about a set including all possible used modulation schemes of the other terminal in the pair of terminals in the paired transmission mode. This is not limited in this embodiment of the present invention. Specifically, the terminal may obtain, according to related information sent by the base station, the information about the modulation scheme used by the other terminal in the pair of terminals in the paired transmission mode, or may obtain, according to modulation scheme information pre-stored in the terminal, the information about the modulation scheme used by the other terminal in the pair of terminals in the paired transmission mode. This is not limited in this embodiment of the present invention. After obtaining the modulation scheme used by the other terminal in the paired transmission mode, the processor 702 is further configured to determine a downlink data transmit power ratio/coefficient according to the obtained modulation scheme, to determine the downlink data transmit power.

It may be understood that, for specific implementations of and interaction relationships between the receiver 701, the processor 702, the transmitter 703, and the memory 704 of the terminal in this embodiment of the present invention, refer to the specific descriptions of the method in the method embodiment. Details are not described herein again. It should be understood that, the receiver and the transmitter herein may implement related operations, for example, by using a radio frequency circuit, and the radio frequency circuit may be configured to send and receive information or a signal.

In the foregoing embodiments, the description of each embodiment has respective focuses. For a part that is not described in detail in an embodiment, refer to related descriptions in other embodiments.

A person of ordinary skill in the art may be aware that, in combination with the examples described in the embodiments disclosed in this specification, units and algorithm steps can be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiments are merely examples. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of the present invention may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present invention essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of the present invention. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A wireless communication method, applied to a multiuser superposition transmission (MUST) system, the method comprising:
   receiving, by a terminal, information that indicates a terminal type corresponding to a transmission mode from a base station, wherein the transmission mode is used to send data to the terminal in a current scheduling period, and is one of a paired transmission mode or a non-paired transmission mode;
   receiving, by the terminal, a power parameter that is used to determine downlink data transmit power, from the base station, wherein the power parameter comprises $PA_{MUST}$ and $P_A$, and $PA_{MUST}$ is a power parameter in the MUST system; and
   determining, by the terminal according to the information, a transmission mode used by the terminal wherein the terminal determines the transmission mode is a paired transmission mode, according to the $PA_{MUST}$, downlink data transmit power and $P_A$ is a power parameter defined in an existing protocol.

2. The method according to claim 1, wherein the terminal determines, according to energy per resource element of a cell-specific reference signal, the power parameter used to determine the downlink data transmit power, and the information indicating the transmission mode used by the base station to send data to the terminal in the current scheduling period, downlink data transmit power that is used by the base station to send data to the terminal.

3. The method according to claim 1, wherein the method further comprises:
   obtaining, by the terminal, downlink data transmit power ratio information, wherein the downlink data transmit power ratio information is a downlink data transmit power ratio of the terminal in the paired transmission mode.

4. The method according to claim 3, wherein the obtaining, by the terminal, downlink data transmit power ratio information comprises:
   receiving, by the terminal, one of the downlink data transmit power ratio information from the base station and indication information of the downlink data transmit power ratio information; and
   obtaining, by the terminal, one of the downlink data transmit power ratio information according to the received downlink data transmit power ratio information and the received indication information of the downlink data transmit power ratio information.

5. The method according to claim 3, wherein if the terminal uses the paired transmission mode, that the terminal determines, according to energy per resource element of a cell-specific reference signal, the power parameter used to determine the downlink data transmit power, and the information indicating the transmission mode used by the base station to send data to the terminal in the current scheduling period, downlink data transmit power that is used by the base station to send data to the terminal comprises:
   determining, by the terminal according to the downlink data transmit power ratio/coefficient information, a downlink data transmit power share occupied by the terminal in downlink data transmit power of a pair of terminals in the paired transmission mode; and
   determining, by the terminal, the downlink data transmit power according to the downlink data transmit power share, the energy per resource element of the cell-specific reference signal, the $PA_{MUST}$, and the information indicating the transmission mode used by the base station to send data to the terminal in the current scheduling period.

6. The method according to claim 3, wherein the method further comprises:
   demodulating, by the terminal, received downlink data according to the determined downlink data transmit power, and feeding back, to the base station, information indicating whether demodulation succeeds.

7. The method according to claim 1, wherein the method further comprises:
   receiving, by the terminal, a first field comprising at least one of indication information of a demodulation reference signal (DMRS) port of a paired terminal of the terminal and indication information of a modulation scheme of a paired terminal of the terminal.

8. The method according to claim 7, wherein the first field indicates a type of the terminal, and the demodulation pilot DMRS port and the modulation scheme of the paired terminal of the terminal in a joint coding manner.

9. An apparatus in a multiuser superposition transmission (MUST) system, the apparatus comprising:
   a receiver, configured to receive information that indicates a terminal type corresponding to a transmission mode from a base station, wherein the transmission mode is a transmission mode that is used to send data to a terminal in a current scheduling period, and is one of a paired transmission mode or a non-paired transmission mode; and receive a power parameter that is used to determine downlink data transmit power, from the base station, wherein the power parameter comprises $PA_{MUST}$ and $P_A$, and $PA_{MUST}$ is a power parameter in the MUST system; and
   a processor, configured to determine, according to the information received by the receiving module, a transmission mode used by the terminal wherein the processor determines the transmission mode is a paired transmission mode, according to the $PA_{MUST}$, downlink data transmit power and $P_A$ is a power parameter defined in an existing protocol.

10. The apparatus according to claim 9, wherein the processor is further configured to determine, according to energy per resource element of a cell-specific reference signal, the power parameter used to determine the downlink data transmit power, and the information indicating the transmission mode used by the base station to send data to the terminal in the current scheduling period, downlink data transmit power that is used by the base station to send data to the terminal.

11. The apparatus according to claim 9, wherein the processor is further configured to obtain downlink data transmit power ratio information, wherein the downlink data transmit power ratio information is a downlink data transmit power ratio of the terminal in the paired transmission mode.

12. The apparatus according to claim 11, wherein the receiver is further configured to receive one of the downlink data transmit power ratio information from the base station and indication information of the downlink data transmit power ratio information;
    and the processor is further configured to obtain the downlink data transmit power ratio information according to the received downlink data transmit power ratio information or the received indication information of the downlink data transmit power ratio information.

13. The apparatus according to claim 11, wherein the processor is further configured to demodulate received downlink data according to the determined downlink data transmit power; and
    the apparatus further comprises a transmitter, configured to feedback, to the base station, information indicating whether demodulation succeeds.

14. The apparatus according to claim 9, wherein the receiver is further configured to receive a first field, wherein the first field comprises at least one of indication information of a demodulation reference signal DMRS port of a paired terminal of the terminal and indication information of a modulation scheme of a paired terminal of the terminal.

15. A non-transitory computer-readable medium comprising instructions that, when executed, cause an apparatus in a multiuser superposition transmission (MUST) system to implement the following steps:
    receiving, by a terminal, information that indicates a terminal type corresponding to a transmission mode from a base station, wherein the transmission mode is a transmission mode that is used to send data to the terminal in a current scheduling period, and is one of a paired transmission mode or a non-paired transmission mode;
    receiving, by the terminal, a power parameter that is used to determine downlink data transmit power, from the base station, wherein the power parameter comprises $PA_{MUST}$ and $P_A$, and $PA_{MUST}$ is a power parameter in the MUST system; and
    determining, by the terminal according to the information, a transmission mode used by the terminal wherein the terminal determines the transmission mode is a paired transmission mode, according to the $PA_{MUST}$ downlink data transmit power and $P_A$ is a power parameter defined in an existing protocol.

16. The medium according to claim 15, wherein the apparatus is further caused to implement:
    obtaining, by the terminal, downlink data transmit power ratio information, wherein the downlink data transmit power ratio information is a downlink data transmit power ratio of the terminal in the paired transmission mode.

17. The medium according to claim 16, wherein the apparatus is further caused to implement:
    receiving, by the terminal, the downlink data transmit power ratio information from the base station or indication information of the downlink data transmit power ratio information; and
    obtaining, by the terminal, the downlink data transmit power ratio information according to the received downlink data transmit power ratio information or the received indication information of the downlink data transmit power ratio information.

* * * * *